(12) United States Patent
Friesen et al.

(10) Patent No.: US 11,905,687 B2
(45) Date of Patent: Feb. 20, 2024

(54) HYGROSCOPIC SYSTEMS AND METHODS FOR GENERATING WATER FROM AIR

(71) Applicant: Source Global, PBC, Scottsdale, AZ (US)

(72) Inventors: Cody Friesen, Scottsdale, AZ (US); Kamil Salloum, Scottsdale, AZ (US); Joel Hayes, Scottsdale, AZ (US); Kimberly McGuinness, Scottsdale, AZ (US); Emerson Jones, Scottsdale, AZ (US); Paul Johnson, Scottsdale, AZ (US); Michael Robinson, Scottsdale, AZ (US); Jonathan Goldberg, Scottsdale, AZ (US)

(73) Assignee: Source Global, PBC, Scottsdale, AZ (US)

( * ) Notice: Subject to any disclaimer, the term of this patent is extended or adjusted under 35 U.S.C. 154(b) by 133 days.

(21) Appl. No.: 17/711,459

(22) Filed: Apr. 1, 2022

(65) Prior Publication Data
US 2022/0316192 A1 Oct. 6, 2022

Related U.S. Application Data

(60) Provisional application No. 63/274,753, filed on Nov. 2, 2021, provisional application No. 63/170,366, filed on Apr. 2, 2021.

(51) Int. Cl.
*B01D 53/04* (2006.01)
*B01D 53/26* (2006.01)
*E03B 3/28* (2006.01)

(52) U.S. Cl.
CPC .......... *E03B 3/28* (2013.01); *B01D 53/0438* (2013.01); *B01D 53/0454* (2013.01);
(Continued)

(58) Field of Classification Search
CPC .................. B01D 53/04; B01D 53/0438; B01D 53/0454; B01D 53/261; B01D 53/265;
(Continued)

(56) References Cited

U.S. PATENT DOCUMENTS 4,285,702 A * 8/1981 Michel .................... F24S 23/77
96/111
4,342,569 A * 8/1982 Hussmann ................ E03B 3/28
96/144

(Continued)

*Primary Examiner* — Frank M Lawrence, Jr.
(74) *Attorney, Agent, or Firm* — Snell & Wilmer L.L.P.

(57) ABSTRACT

Water generation systems and methods of generating water from air are disclosed herein. Systems for generating water from air can comprise a solar thermal unit comprising a hygroscopic material, composite or assembly configured to capture water vapor from air during a loading cycle and release water vapor to a working fluid during an unloading cycle. Water generation systems can further include a condenser for condensing water vapor from the working fluid to produce water. Methods for generating water from air disclosed herein can comprise receiving a system operational parameter from a loading and/or unloading cycle. Methods of operation can also include determining a loading and/or unloading system operational setpoint based on the system operational parameter. During a loading cycle, the method includes flowing ambient air through the hygroscopic material, composite or assembly to capture water vapor from air.

20 Claims, 16 Drawing Sheets

(52) U.S. Cl.
CPC ........ *B01D 53/261* (2013.01); *B01D 2257/80* (2013.01); *B01D 2259/40098* (2013.01)

(58) Field of Classification Search
CPC ........ B01D 2259/40098; B01D 5/0051; E03B 3/28; Y02A 20/212
USPC ........... 95/1, 2, 8, 10, 11, 14, 117, 121–124; 96/109–112, 115, 116, 126, 130, 146; 34/80, 472, 473
See application file for complete search history.

(56) References Cited

U.S. PATENT DOCUMENTS

| | | | | |
|---|---|---|---|---|
| 4,377,398 | A * | 3/1983 | Bennett | F25B 15/00 96/146 |
| 2005/0044862 | A1* | 3/2005 | Vetrovec | B01D 53/265 62/93 |
| 2011/0232485 | A1* | 9/2011 | Ellsworth | B32B 3/26 95/91 |
| 2017/0354920 | A1* | 12/2017 | Switzer | B01D 53/06 |
| 2019/0372520 | A1* | 12/2019 | Friesen | H02S 40/44 |
| 2020/0283997 | A1* | 9/2020 | Salloum | E03B 3/28 |
| 2020/0332498 | A1* | 10/2020 | Friesen | F24F 3/1429 |
| 2022/0228351 | A1* | 7/2022 | Friesen | B01D 53/265 |

* cited by examiner

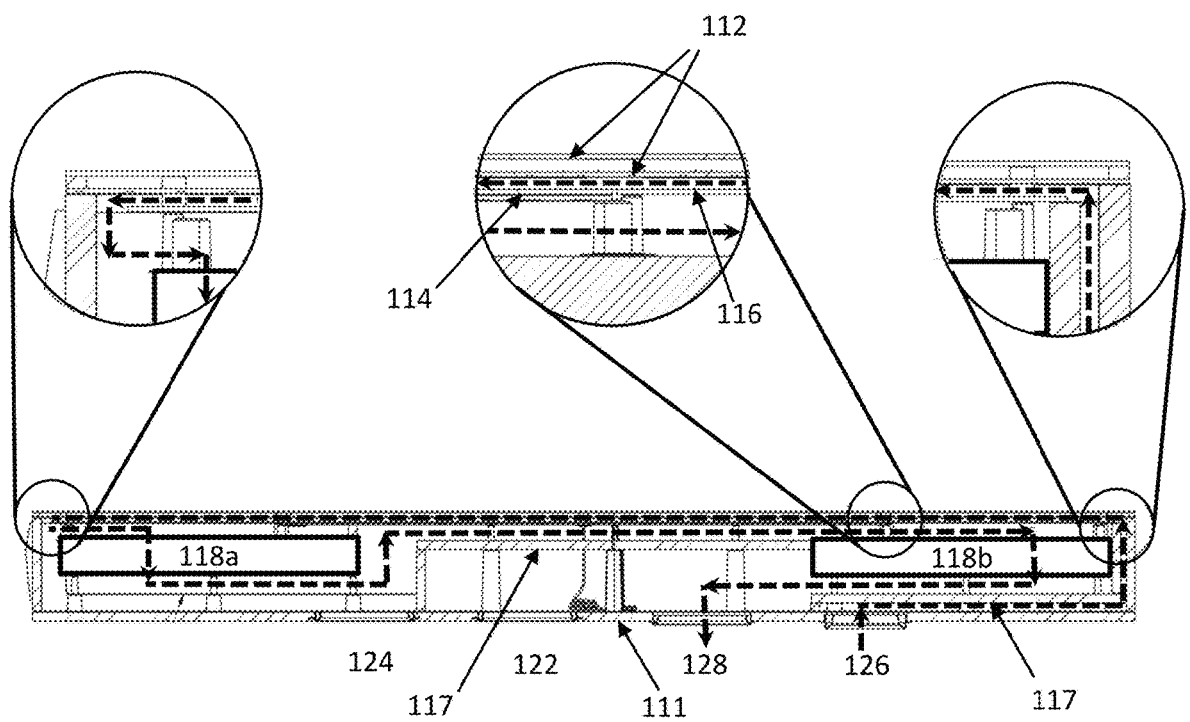

HYGROSCOPIC SYSTEMS AND METHODS FOR GENERATING WATER FROM AIR

CROSS-REFERENCE TO RELATED APPLICATIONS

This application claims priority to, and the benefit of, U.S. Provisional Patent Application Ser. No. 63/170,366, filed on Apr. 2, 2021 entitled "HYGROSCOPIC SYSTEMS AND METHODS FOR GENERATING WATER FROM AIR" and U.S. Provisional Patent Application Ser. No. 63/274,753, filed on Nov. 2, 2021 entitled "SYSTEMS AND METHODS FOR GENERATING WATER FROM AIR", the disclosures of which are hereby incorporated by reference in their entirety.

TECHNICAL FIELD

This disclosure is related to systems and methods for generating water from a gas with a hygroscopic components.

BACKGROUND

Producing water, i.e., liquid water, by extracting water vapor from ambient air or atmospheric air can present various challenges. Certain challenges are associated with approaches employing desiccant or hygroscopic materials for water uptake and release of water vapor to produce water. Water from air systems can include solid or liquid desiccants. Systems employing liquid desiccants often take an approach of spraying a liquid desiccant mist to improve the interaction with and water uptake from a gas. However this approach can require significant energy and additional separation processes for released water and exhaust gas. Systems employing solid desiccants can be relatively inefficient for water production due to various considerations including limited surface areas and limited mass-specific water uptake potential.

There exists a need for improved systems and methods for efficient and consistent water production with hygroscopic systems in deployable form factors.

SUMMARY OF THE INVENTION

Water generation systems and methods of generating water are disclosed herein. In various embodiments, a system for generating water comprises a solar thermal unit including a composite assembly comprising a hygroscopic composite to capture water vapor from a process gas, for example ambient air, flowing in a process flow path through the composite assembly, for example during a loading cycle. Composite assemblies disclosed herein can be configured to absorb thermal energy and release water vapor to a working fluid (e.g., air) flowing in a regeneration flow path through the composite assembly, for example during an unloading cycle. Water generation systems of the present disclosure can comprise a condenser for condensing water vapor from the working fluid flowing in the regeneration flow path to produce water.

Methods for generating or producing water from air are disclosed herein. In various embodiments, a method for generating water from air comprises receiving a property of a hygroscopic material, composite or assembly of a solar thermal unit. The method can further comprise receiving a system operational parameter from a loading and/or unloading cycle of the solar thermal unit. Some methods can include determining an equilibrated water content of the hygroscopic material, composite or assembly based on the received operational parameter and the received property of a hygroscopic material, composite or assembly. Methods of operation can also include determining a loading and/or unloading system operational setpoint based on the system operational parameter and/or determined equilibrated water content. During a loading cycle, the method can include flowing a process gas (e.g., ambient air) in a process flow path such that the hygroscopic material, composite or assembly captures water vapor from the process gas. Methods described herein can include transitioning from a loading cycle to an unloading cycle in which a working gas (e.g., air) flows in a regeneration flow path to accumulate heat and water vapor from the hygroscopic material, composite or assembly. The exemplary methods can further include condensing water vapor from the working fluid in the regeneration flow path to produce water during the unloading cycle.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale (unless otherwise noted), meaning the sizes of the depicted elements are accurate relative to each other for at least the embodiment in the view.

FIG. 3B illustrates a illustrates an enlarged portion of a cross-sectional view of a process flow path in a solar thermal unit, according to an embodiment;

FIG. 3C illustrates a illustrates an enlarged portion of a cross-sectional view of a process flow path in a solar thermal unit, according to an embodiment;

FIG. 3D illustrates a illustrates an enlarged portion of a cross-sectional view of a process flow path in a solar thermal unit, according to an embodiment;

FIG. 4A illustrates a cross-sectional view of a regeneration flow path in a solar thermal unit, according to an embodiment;

FIG. 4B illustrates a cross-sectional view of an enlarged portion of a regeneration flow path in a solar thermal unit, according to an embodiment;

FIG. 4C illustrates a cross-sectional view of an enlarged portion of a regeneration flow path in a solar thermal unit, according to an embodiment;

FIG. 4D illustrates a cross-sectional view of an enlarged portion of a regeneration flow path in a solar thermal unit, according to an embodiment;

Figure 1:
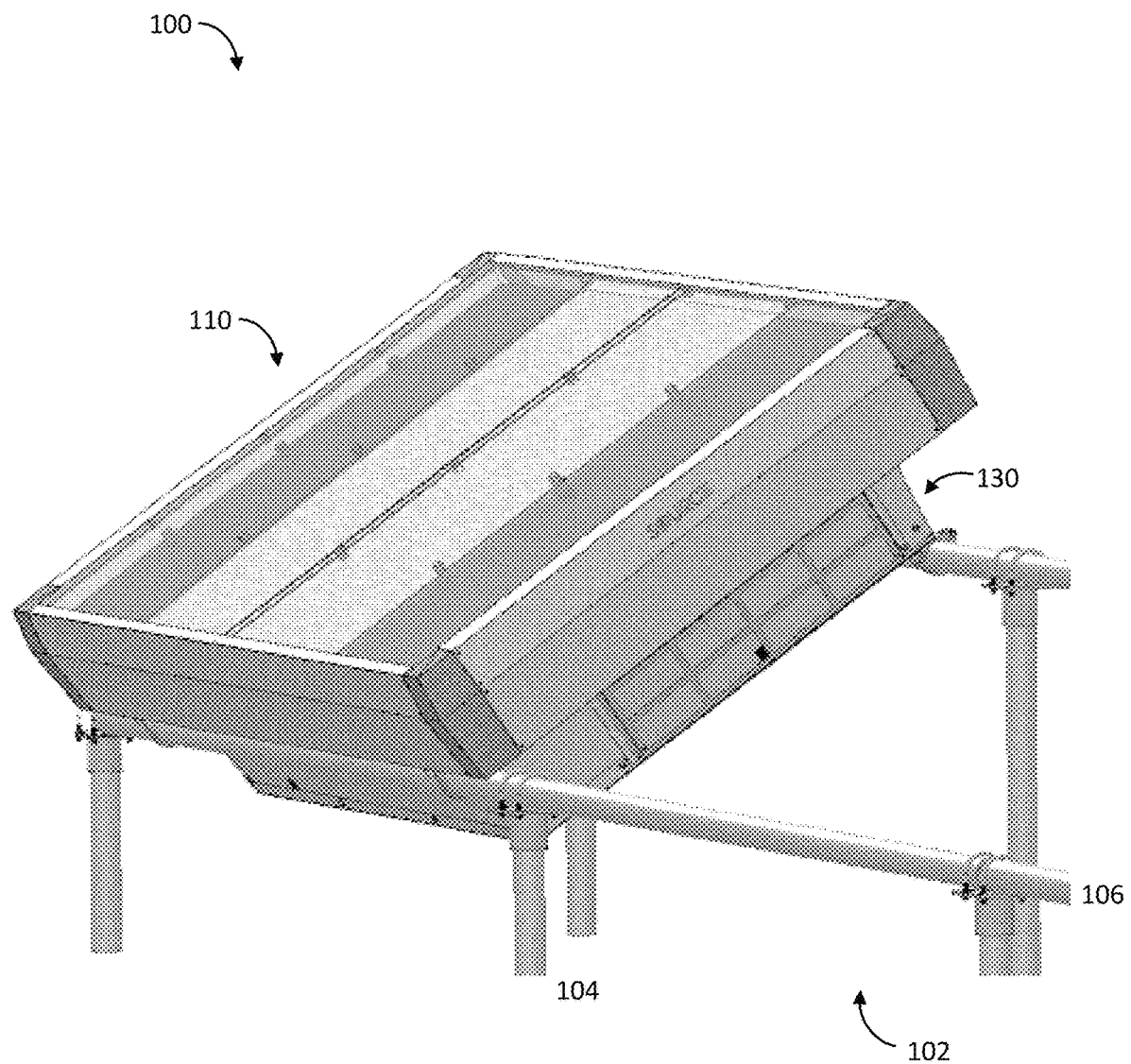
FIG. 1 depicts a water generation system, according to an embodiment.

For simplicity and clarity of illustration, the drawing figures show the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

DESCRIPTION OF ILLUSTRATIVE EMBODIMENTS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure.

Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials.

This disclosure includes embodiments of systems and methods, such as, for example, for water treatment and storage. The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately" and "about" may be substituted with "within [a percentage] of" what is specified, where the percentage includes 0.1, 1, 5, and 10%. Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements Likewise, a method that "comprises," "has," "includes," or "contains" one or more operations or steps possesses those one or more operations or steps, but is not limited to possessing only those one or more operations or steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. The feature or features of one embodiment may be applied to other embodiments or implementations, even though not described or illustrated, unless expressly prohibited by this disclosure or the nature of the embodiments.

As will be described in detail below, this disclosure describes various systems and methods for efficient water production from a process gas, for example ambient air. The systems and methods for producing water from ambient air can provide several advantages including efficient and consistent production of water using durable hygroscopic materials, composites and assemblies. The present technology can combine a hygroscopic material, composite and/or assembly design approach with an operational control approach to realize long-term operational stability and efficiencies to produce water from air.

FIG. 1 depicts a water generation system 100 for generating water from a process gas containing water vapor. In various embodiments, the process gas comprises ambient air at atmospheric pressure. System 100 comprises a solar thermal unit 110 configured to absorb solar energy (e.g., from solar insolation during the day) above a lower housing assembly 130. The lower housing assembly 130 can comprise a condenser and in some implementations an energy, enthalpy or heat exchange unit which will be described in more detail below.

System 100 can be installed or mounted above a ground surface or rooftop via a mounting assembly. In some embodiments, water generation system 100 can be mounted on a tracking assembly (e.g., single axis solar tracker, multi axis solar tracker and the like) configured to track movement of the sun to maximize thermal energy input to the solar thermal unit. In other embodiments, mounting or support assembly 102 can be configured to position system 100 in a fixed tilted configuration i.e., at a slight angle relative to the ground surface or rooftop, for example toward the southern sky for an installation in the Northern Hemisphere, or toward the northern sky for an installation in the Southern Hemisphere. The descriptive terms used herein such as front, rear, above, below, top, bottom, over, under, etc. are used to aid understanding of the invention are not used in a limiting sense. Furthermore, the directions north, south, east and west may be used herein assuming the installation site is in the Northern Hemisphere, however opposite directions can be used for installations in the Southern Hemisphere without departing from the spirit and scope of the present disclosure.

As depicted in FIG. 1, mounting or support assembly 102 comprises a plurality of vertical piers 104 supporting a plurality of horizontal beams 106 at a height above the ground surface. The horizontal beams 106 can extend in a generally horizontal or for example, an east-west axis. In the example shown, the vertical piers 104 on a generally north side have a height greater than those positioned on a generally south side. As such, the front surface of system 100 (i.e. front surface of solar thermal unit 110) is oriented at fixed tilt angle to face a southern direction. The northern edge of lower housing assembly 130 is supported above horizontal beams 106 to facilitate access to panels located on generally north, east and west sides of system 100, thereby enabling field serviceability as will be described in more detail below.

In various embodiments, a solar thermal unit comprises one or more interstitial layers below a top cover layer for collecting solar radiation. In one example, the one or more interstitial layers can comprise an assembly including one or more photovoltaic (PV) panels for converting solar insolation to electrical energy, one or more glazing layers (e.g. glass layers), or a combination thereof. Solar thermal units of the present disclosure convert solar insolation to thermal energy by transferring energy from sunlight to a regeneration fluid, heat absorbing fluid and/or working fluid that flows through the solar thermal unit. In some embodiments, the solar thermal unit is configured at least partially as a solar photovoltaic unit which converts solar insolation to both electrical and thermal energy. In at least some examples, solar thermal units of the present disclosure may be configured such that the temperature gradient increases along the depth of the solar thermal unit, in the direction that a heat absorbing fluid flows along a regeneration flow path within the solar thermal unit. This may result in heat being substantially extracted and/or directed away from one or more upper layers of the system, for example, an uppermost glazing layer that has contact with ambient air, keeping such layers relatively cool. A regeneration flow path of the solar thermal unit can be configured to direct a regeneration fluid and/or working gas to collect heat from a glazing layer, from one or more interstitial layers disposed below and spaced apart from a glazing layer, or from a combination thereof.

Figure 2A:
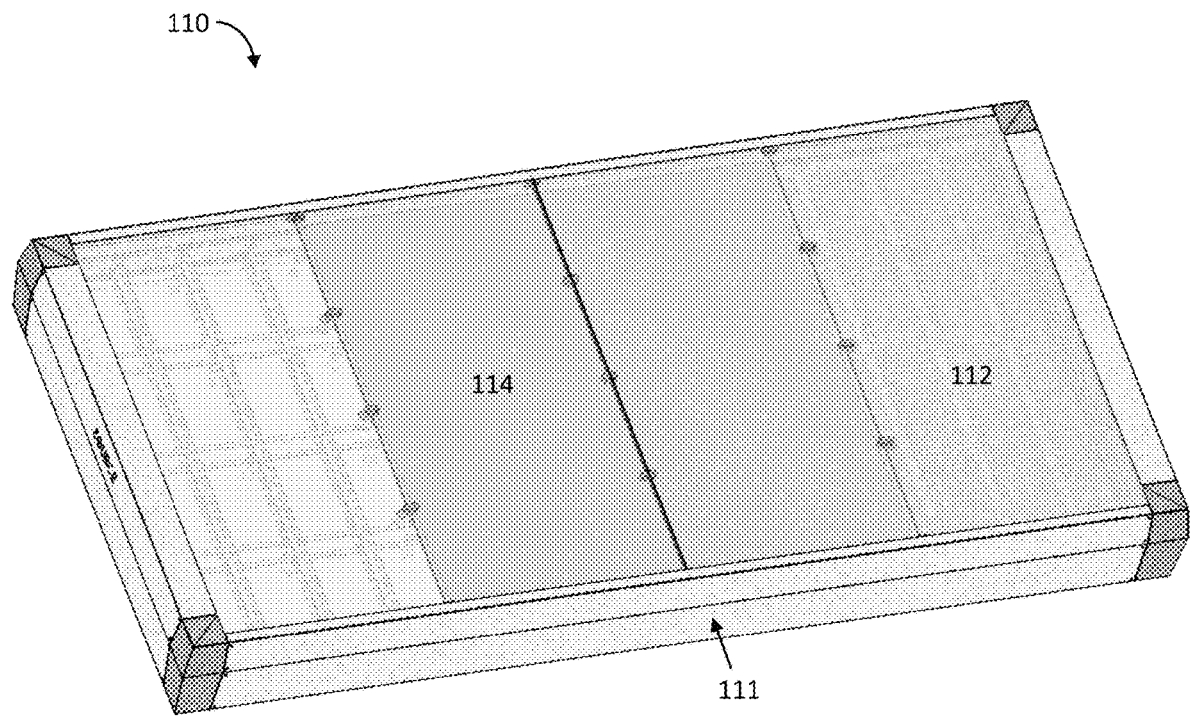
FIG. 2A illustrates a top-down perspective view of a solar thermal unit, according to an embodiment.
Figure 2B:
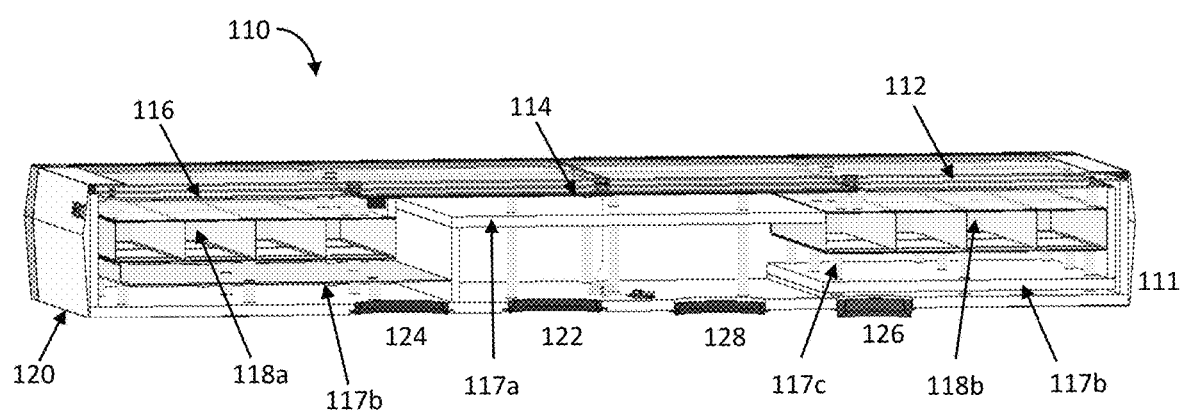
FIG. 2B illustrates a cross-sectional side view of a solar thermal unit, according to an embodiment.
Figure 2C:
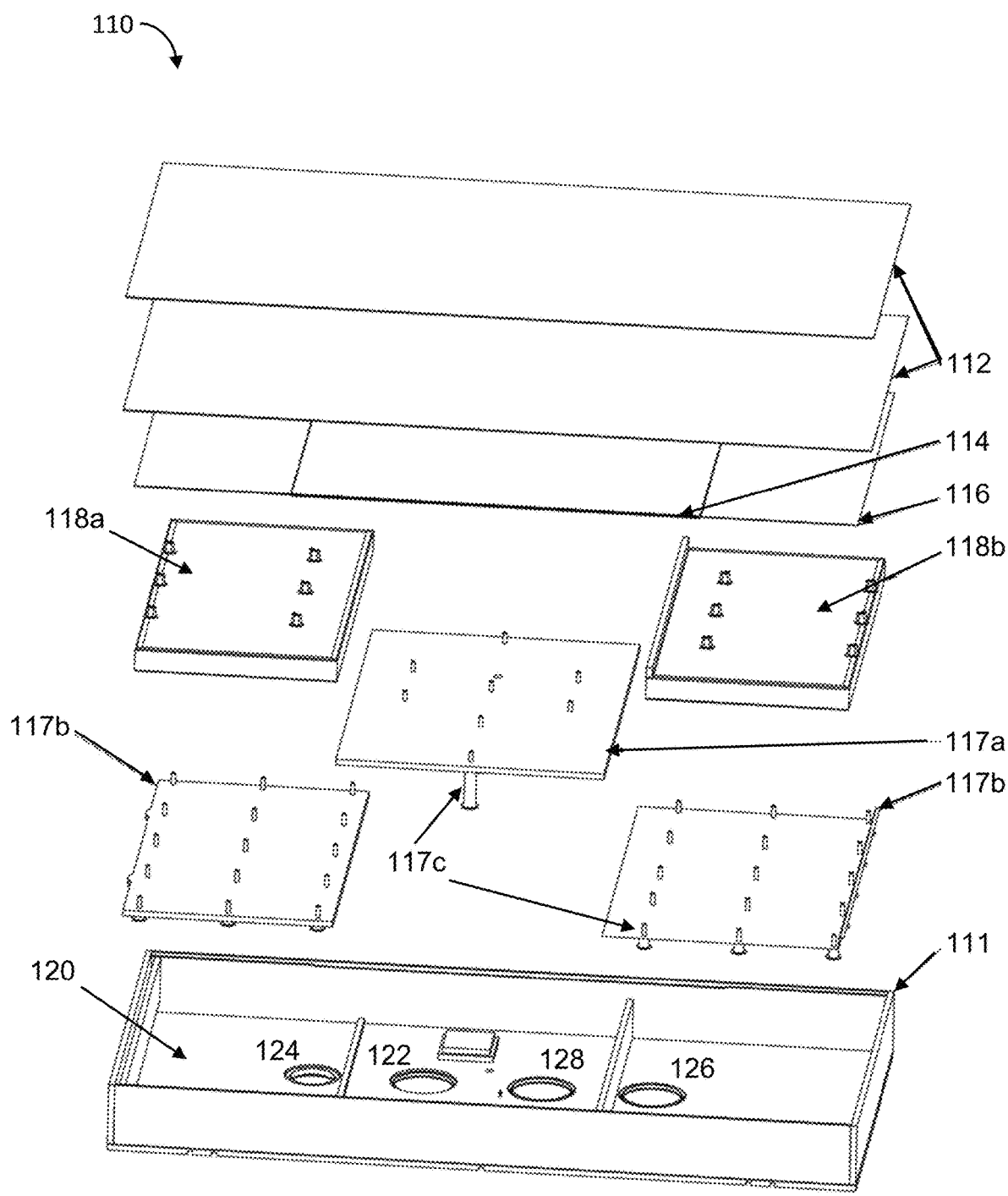
FIG. 2C illustrates an exploded view of a solar thermal unit, according to an embodiment.

FIG. 2A shows a top-down perspective view of solar thermal unit 110, FIG. 2B shows a side cross-sectional view of solar thermal unit 110 and FIG. 2C shows an exploded view of solar thermal unit 110. Solar thermal unit 110 includes a housing 111 (e.g., thermally insulated protective housing) and a top cover or top outer surface that includes glazing layer 112 (e.g., one or more glass layers) and a photovoltaic (PV) panel 114 beneath glazing layer 112. In various embodiments, the solar thermal unit comprises one or more interstitial layers, for example interstitial layers 116 below the top surface, cover layer or glazing layers. As depicted, glazing layer 112 includes a top glazing (e.g., glass panel) and a mid-glazing (e.g., glass panel) that are positioned above a PV panel 114 centered at interstitial layer 116. However, in other embodiments, one or more PV panels can be included in a top layer and/or a mid-glazing layer of a solar thermal unit and can be positioned in alternative locations (e.g., along one or more sides or edges of solar thermal unit). The top surface layer, glazing layers and/or interstitial layers of solar thermal unit 110 can include a transparent material (e.g., glass) allowing solar radiation to pass into the interior of solar thermal unit 110, for example through glazing layer 112 and interstitial layer 116.

The interior volume of solar thermal unit 110 can be architected or configured to equilibrate, direct and distribute gases flowing therethrough by using any desirable static or active means, for example, plenum, flow dividers, separators, baffles, flow straighteners, spacers and/or manifolds. For example, plenum 117a, separators 117b and spacers 117c may be configured to define the process and working fluid flow paths in the solar thermal unit 110 for load and/or unloading operational cycles.

In various embodiments, some or all portions of the process gas flow path can be configured to be sized larger relative to the portions of the regenerations flow path in the solar thermal unit. For example, one dimension (e.g., height) of the process flow path can be greater or equal to four times another dimension (e.g. height) of the regeneration flow path in the solar thermal unit. In this non-limiting example, flow between parallel plates is cubic in relation to the height between a top and bottom flow plate. In such embodiments, a greater dimensional height for the process flow path can allow for a higher flow volume with minimal risk of a process flow path crossing to a regeneration flow path, for example during a loading operational mode or cycle.

In some embodiments, interstitial layer(s) (e.g., 116) may promote flow interaction with glazing layers (e.g., 112) and/or photovoltaic (PV) panels (e.g., 114) resulting in increased heat extraction by the working gas. Interstitial layers may be made of the same materials or different materials. In addition to creating thermal energy, some examples of solar thermal units of the present disclosure may also create electrical energy. In such examples, the electrical energy or power may be created by photovoltaic (PV) modules or panels (e.g., 114) that include one or more photovoltaic cells, which may be positioned at a top cover or surface of solar thermal unit 110. A heat absorbing fluid or working gas entering the upper portion of solar thermal unit 110 may collect heat from the one or more photovoltaic (PV) panels (e.g., 114). Because photovoltaic cells operate more efficiently when they are cooled, the working fluid collecting heat from the one or more photovoltaic (PV) panels may maintain or improve the efficiency of one or more photovoltaic (PV) panels, as well as increasing the amount of heat absorbed by the working fluid. The solar thermal unit 110 depicted in FIG. 2A-2C includes three layers: a top cover layer (e.g., glass) and a mid-glazing and an interstitial layer (e.g., a combination of glass and solar cells), however other numbers, configurations and compositions of upper layer(s) of the solar thermal unit may be employed without departing from the spirit and scope of this disclosure. For example, in some embodiments, the solar thermal unit can comprise a top cover layer and a single interstitial layer, between which the working fluid can be directed to absorb heat.

In the example of FIG. 2A-C, the solar thermal unit comprises separate light and/or heat absorbing material bodies or layers 118a, 118b positioned below and spaced apart from the glazing layers 112 and interstitial layers 116. A heat absorbing layer can be one of several substantially planar layers of a solar thermal unit having a thickness through which a fluid may flow and/or across a surface of which a fluid may flow. A heat absorbing body can be a distinct material mass within a solar thermal unit, also having a thickness through which a fluid may flow and/or across a surface of which a fluid may flow. In many embodiments, the absorbing bodies or layers 118 can comprise or be formed of a porous hygroscopic material, composite or assembly configured to absorb water vapor from a process gas (e.g., ambient air at atmospheric pressure) flowing therethrough, for example during a loading operational mode or cycle. Furthermore, a regeneration or working fluid can accumulate heat and water vapor upon flowing across and/or through the porous hygroscopic material, composite or assembly, for example during a regeneration or release operational mode or cycle. In various embodiments, the solar thermal unit includes one or more interstitial layers between the absorbing layer(s) and the top cover layer or glazing layer(s). During a release operational mode or cycle, the working fluid can flow along the one or more interstitial layers in advance of the one or more absorbing layer(s) to collect heat from the one or more interstitial layers and collect water vapor from the one or more absorbing layer(s) when comprising a hygroscopic material.

In many embodiments the absorbing body(s) or layer(s) (e.g., 118) comprise or are formed of a porous hygroscopic layer, material, composite, or assembly for capture and release of water vapor and can have various compositions and structures which will be described in more detail below. For the purposes of this description, the following terms will be used to describe hygroscopic or water vapor sorption/desorption bodies or layers within the solar thermal unit, unless otherwise noted.

The term "hygroscopic media" or "hygroscopic material" is used herein to describe a functional material involved in absorption/adsorption and desorption of water.

The term "support media" or "support substrate" is used herein to describe a support structure that has a tuned or specified pore distribution to support a deliquescent salt or hygroscopic material, for example such that as the hygroscopic material gains water and transitions to a liquid state, the resulting capillary forces generated by the interaction of the liquid and the pore walls substantially retains the liquid in the pore structure.

The term "hygroscopic composite" or "composite material" is used herein to describe the combination of the support media and the hygroscopic media. The hygroscopic media is supported in and on the surfaces defined by the internal pore structure and external surface geometry of the support media.

The term "hygroscopic composite assembly" or "composite assembly" is used herein to describe the assembly, form, or structure created to hold the "hygroscopic composite" into a functional part that meets the physical criteria of the system including structural properties, pressure drop, flow paths, and thermal properties. The composite assembly can be a loose packed structure of the composite material held within a frame, or it can itself be a composite structure containing the composite material, a binder, and/or structural components that form a rigid self-supporting composite. In an embodiment, the terms "hygroscopic composite assembly" or "composite assembly" may be used interchangeably with the terms for absorbing "body" or "layer," for example those components indicated at 118, when they are hygroscopic. In many embodiments, the solar thermal unit 110 is a thermal desiccant unit or thermal hygroscopic unit that includes a hygroscopic material, composite, and/or composite assembly within the housing 111. In an embodiment, the absorbing body(s) or layer(s), for example indicated at 118, can be a hygroscopic material, composite, and/or composite assembly. In such embodiments, the terms absorbing body and/or absorbing layer may be used interchangeably with the terms hygroscopic material, hygroscopic composite, and/or hygroscopic composite assembly so as to refer to a specific implementation wherein the absorbing body or layer of the solar thermal unit are hygroscopic.

The hygroscopic material can be configured to capture water vapor from a process gas, for example during a loading operational mode or cycle, and release captured water vapor to a regeneration fluid or "working" fluid during a release operational mode or cycle. In various embodiments, the hygroscopic material can be configured as one or more porous hygroscopic bodies or layers, for example as a hygroscopic composite including a support substrate. The 'porous' or 'porosity' characterization term used herein can describe a flow-through implementation, as opposed to flow-over or flat plate implementations of a hygroscopic material within a solar thermal unit. While flow-over or flat plate implementations could be employed without departing from the scope of this invention, it may be preferable to keep the boundary layers small with a high degree of percolation, for example as can be provided in porous flow-through bodies. A porous hygroscopic composite or composite assembly can be further configured to absorb thermal energy (e.g., radiative solar thermal energy) and release captured water vapor to a working or regeneration fluid, for example during a release operational mode or cycle. In one example, a hygroscopic material and/or hygroscopic composite can be arranged within a flow distributor, such as but not limited to a lattice structure, top and bottom rigid porous plates, inter-corrugated fluidic channels, and/or woven and fiber meshes to sustain back pressure and distribute the flow. As will be described in more detail below, a hygroscopic composite can be further configured as a composite assembly such that its structure provides the system with structural properties, pressure drop, flow paths, and/or thermal properties.

In various embodiments, the interior layers and components of solar thermal unit 110 can be configured into a split-flow and/or partitioned operational design having two or more fluid flow paths. As depicted in FIG. 2B-2C, solar thermal unit 110 can comprise a process inlet port 122 for inputting, during a loading operational mode, a process gas (e.g., ambient air) and a process outlet port 124 for outputting the process gas (e.g., ambient air) arranged along a rear portion or rear surface plane 120 of housing 111. Furthermore, solar thermal unit 110 can comprise a regeneration inlet port 126 for inputting, during a release operational mode, a regeneration fluid or "working" gas and a regeneration outlet port 128 for outputting the regeneration fluid or working gas arranged along a rear surface plane 120 of solar thermal unit 110.

As described in more detail below, various systems for generating water from a process gas (e.g., ambient air) comprise a solar thermal unit including one or more hygroscopic bodies, layers or assemblies. A hygroscopic body, layer or assembly is configured to capture water vapor from a process gas flowing in a process flow path through the hygroscopic body, layer or assembly during a loading cycle. Additionally, the hygroscopic body, layer or assembly is configured to absorb thermal energy (e.g. via solar insolation and/or regeneration gas convection) and release water vapor to a regeneration or working fluid flowing in a regeneration flow path through the hygroscopic body, layer or assembly during an unloading cycle. Various systems for generating water from a process gas further comprise a condenser for condensing water vapor to produce water from the regeneration or working fluid flowing in the regeneration flow path after flowing through the solar thermal unit.

Figure 3A:
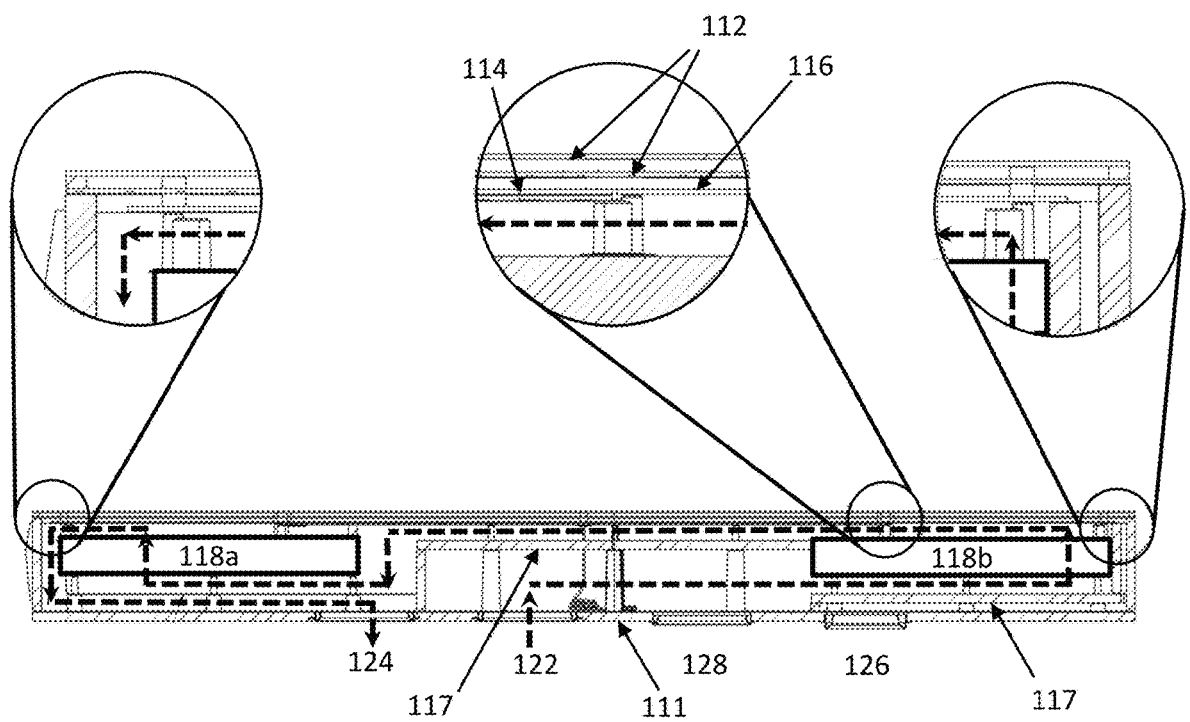
FIG. 3A illustrates a cross-sectional view of a process flow path in a solar thermal unit, according to an embodiment.

FIG. 3A-D and FIG. 4A-D depict solar thermal unit 110 comprising a flow architecture including two fluid flow paths wherein fluid flow is directed in series through split or separate hygroscopic composite assemblies 118a and 118b. FIGS. 3B, 3C and 3D depict enlarged portions of a cross-sectional view of a process flow path depicted in FIG. 3A. FIGS. 4B, 4C and 4D depict enlarged portions of a cross-sectional view of a regeneration flow path depicted in FIG. 4A.

FIG. 3A-D depict a process flow path (indicated by dashed lines) wherein a process gas, for example ambient air, flows into solar thermal unit 110 via process inlet port 122, through the interior of solar thermal unit 110 and exits via the process outlet port 124, for example during a loading operational mode or cycle. The process flow path (dashed line of FIG. 3A-D) may first direct process gas through the hygroscopic composite assembly 118b, along an intermediate flow segment below interstitial layer 116 and then through hygroscopic composite assembly 118a. During a loading mode or cycle, hygroscopic composite assemblies 118a and 118b capture water vapor from the process gas upon flowing therethrough.

FIG. 4A-D depict a regeneration flow path (indicated by dashed lines) wherein a regeneration fluid or working gas flows into solar thermal unit 110 via regeneration inlet port 126, through the interior of solar thermal unit 110, and exits via the regeneration outlet port 128 during an unloading or release operational mode. As depicted, a plurality of flow-directing elements 117 define regeneration flow path (dashed line of FIG. 4A-D) that first directs a regeneration or working gas to a top segment or upper portion of the solar thermal unit, for example between mid-glazing layer 112 and PV panel 114 of interstitial layer 116, to collect heat and then through the hygroscopic composite assemblies 118a and 118b to collect additional heat and/or water vapor. This may result in heat being substantially extracted or directed away from the upper layers of the system, such as glazing layer 112, keeping such layers relatively cool. In contrast, conventional solar thermal units tend to have an outer surface that is very hot. The configuration of the solar thermal unit may also result in heat from the solar insolation being directed to and retained in the most insulated areas of the unit, reducing radiative losses from the unit. Furthermore, the regeneration fluid may collect heat from the PV panel 114 from a top surface and then a bottom surface of the PV panel 114 as depicted in FIG. 4C. Because photovoltaic cells operate more efficiently when they are cooled, the regeneration fluid collecting heat from the PV panel 114 may maintain or improve the efficiency of the PV panel 114, as well as increasing the amount heat absorbed by the regeneration fluid. The front and/or rear sides of the PV panel may be modified to promote flow interaction with the panel to enhance cooling of the panel. Additionally, the cell layout and wiring of the panel may be configured to maximize the panels performance considering temperature gradients across the panel.

Water generation systems of the present technology can be operated between a water uptake or loading cycle and a water release or unloading cycle, for example according to a diurnal cycle (i.e. loading mode during nighttime hours and release mode during daytime hours) so as to produce water with the efficient use of solar energy without external power. The transition between the loading and release mode can be facilitated by closing and opening process ports 122 and 124 of solar thermal unit 110 which are in communication with external ambient air. During the release mode, a working gas flows in a closed-loop regeneration flow path between the solar thermal unit 110 and the lower housing assembly 130. The solar thermal unit 110 can have various flow structuring features (e.g. turns, bends or obstructions) which may improve a heat transfer coefficient from the glazing layers, PV panels and heat and mass transfer coefficients from the porous hygroscopic absorber(s) or layer(s). However, flow structuring features may also produce a backpressure resistance or force opposing the desired flow of working fluid in the regeneration flow path. Process ports 122 and 124 can be sealed during a regeneration mode in an efficient manner so as to maintain a closed-loop regeneration path for the working fluid.

As depicted in FIG. 4A-D, the working fluid flows in regeneration flow path (depicted by dashed arrows) from inlet port 126 to an upper portion of solar thermal unit 110 (e.g., between mid-glazing 112 and interstitial layer 116) to collect heat, and then is directed, via baffles or static separators, to lower porous absorber layers 118a and 118b to collect heat, and water vapor in embodiments comprising hygroscopic materials, composites or composite assemblies, before exiting the solar thermal unit 110 via outlet port 128. In this way, the working fluid efficiently transports absorbed solar heat from the upper portion of the solar thermal unit 110 and transports the absorbed heat through hygroscopic layers 118, 118b in a generally top-down flow path in which solar heat absorbed from a top portion of the solar thermal unit 110 is transferred down to hygroscopic material in layers 118a, 118b.

In the example depicted in FIG. 2B-C, 3A-D and FIG. 4A-D, the regeneration inlet port 126, the regeneration outlet port 128, the process inlet port 122 and the process outlet port 124 are positioned at a rear surface plane 120 of the solar thermal unit 110 interfacing with and configured to be coupled to the lower housing assembly 130. Furthermore, the ports are substantially aligned along a horizontal centerline of the rear surface plane 120 of the solar thermal unit 110, which may be preferable for a compact and field-serviceable water generation system 100. In the example depicted, four ports (i.e. ports 122, 124, 126, 128) are present to direct fluid through a process flow path and a regeneration flow path; however other embodiments may employ different numbers or configurations of ports, for example in association with any desirable valving or fluid routing devices to manage flow into and out of a solar thermal unit. To minimize complexity, maintenance, leakage and/or cost, fewer or simplified fans, blowers, actuators and other fluidic routing devices can also be employed in the solar thermal unit.

The solar thermal unit 110 includes a plurality of flow directing elements 117 to define the process and working fluid flow paths in the solar thermal unit 110 for uptake or loading and/or unloading or release operations. Various flow approaches can be employed including flow-through hygroscopic body or layer implementations, flow-over or flat plate implementations of the hygroscopic material, as well as their combinations or derivatives. In addition, the hygroscopic materials, composites and/or composite assemblies can be configured in various ways relative to the flow directing means, structures or distributors, for example but not limited to lattice structures, rigid porous plates, inter-corrugated fluidic channels, and/or woven and fiber meshes to sustain back pressure and distribute the flow. Various examples of hygroscopic absorber configurations will be described in more detail below.

Figure 5:
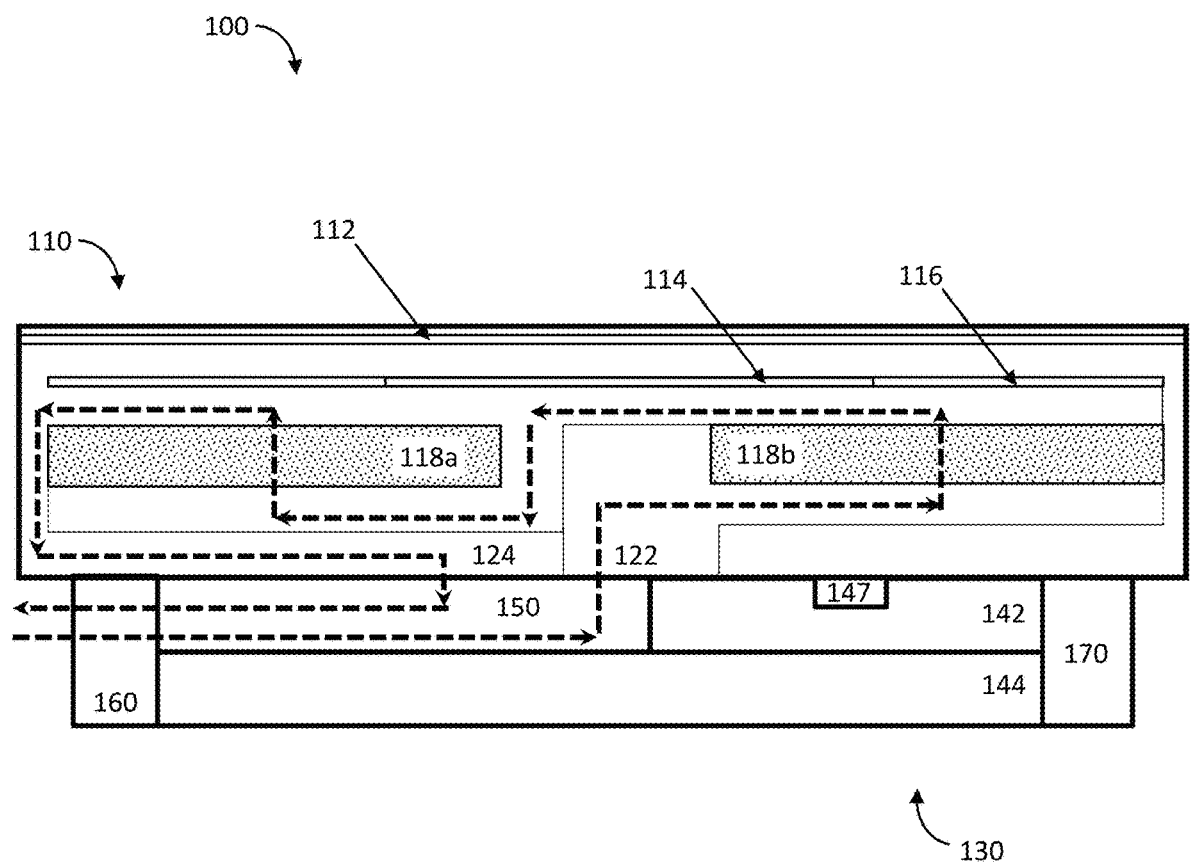
FIG. 5 illustrates a block diagram of a water generation system during an uptake or loading operational cycle, according to an embodiment.

FIG. 5 illustrates a block diagram of a water generation system 100 including solar thermal unit 110 and lower housing assembly 130 during an uptake or loading operational cycle. As depicted in FIG. 5, a process flow path (indicated by dashed lines) can direct ambient air into valve unit 150 via fan assembly 160. Process gas, for example ambient air, from outside system 100 can be transported into system 100, for example via fan assembly 160. In various embodiments, one or more filters can be provided to filter process gas (e.g., remove contaminants like dust and the like from ambient air) in advance of inputting into valve unit or solar thermal unit 110. For example, a porous filter layer can be included as part of the valve unit 150 and/or fan assembly 160. During the loading operational mode, ambient air can enter process inlet port 122, and be transported through solar thermal unit 110 along process flow path indicated by dashed lines in FIG. 5. Upon exiting solar thermal unit 110 at outlet port 124, process gas is directed into valve unit to pass through valve unit 150 and exit system 100, for example via another passage of fan assembly 160 or a different system exhaust location.

FIG. 5 depicts a single valve unit 150, however any desirable number or type of valves, separately or in combination, can be used to manage flow through process inlet port 122 and process outlet port 124 (e.g., seal closed during a regeneration or unloading cycle). Furthermore, system 100 can include one or more valves or mechanisms for flow bypass and/or alternative fluid passageway configurations, as well as to provide a system-wide or total ingress protection mode wherein the lower housing assembly 130 and/or the solar thermal unit 110 are fully sealed, for example in response to a severe weather event forecast. The system can include valves operating under any number of mechanisms including but not limited to an inflatable valve, an iris valve, a butterfly valve, and/or the like.

Figure 6:
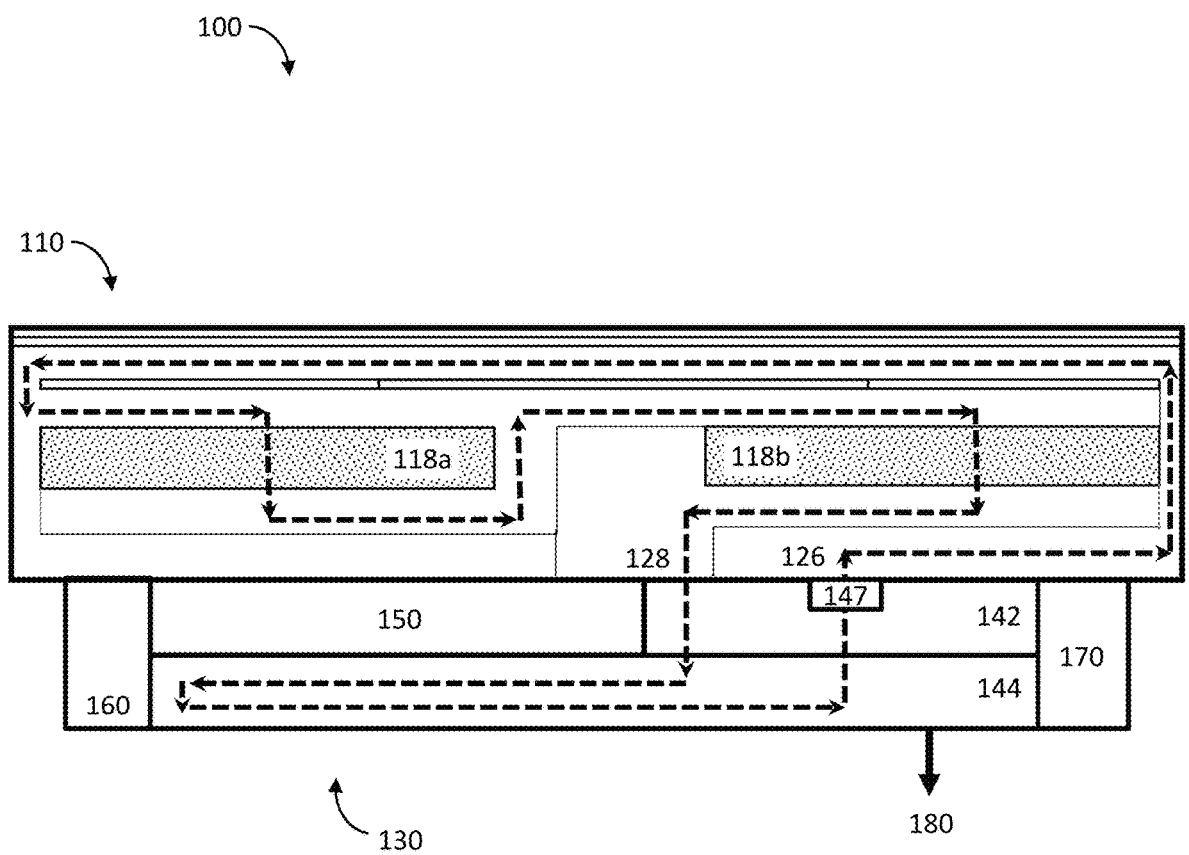
FIG. 6 illustrates a block diagram of a water generation system during an unloading or release operational cycle, according to an embodiment.

FIG. 6 illustrates a block diagram of a water generation system 100 including solar thermal unit 110 and lower housing assembly 130 during an unloading or release operational cycle. As depicted in FIG. 6, a regeneration flow path (depicted in dashed lines) can be substantially closed-loop and can include multiple flow segments through system 100 including: a regeneration flow path segment within solar thermal unit 110 (e.g., as depicted in FIG. 4A-D and FIG. 6); a regeneration flow path segment (e.g., indicated by downward dashed arrow in FIG. 6) from the solar thermal unit 110 to an energy or enthalpy exchange unit 142 in advance of a condenser 144; a regeneration flow path segment within the condenser 144 (e.g., indicated by dashed arrow in condenser 144 of FIG. 6); and a regeneration flow path segment (e.g., indicated by upward dashed arrow in FIG. 6) from the condenser 144 to the solar thermal unit 110 via the exchange unit 142. During the unloading or regeneration operational mode, condenser 144 can include a water production outlet 180 configured to output water, i.e., liquid water, condensed by condenser 144.

System 100 can include one or more blowers or fans (e.g., removable cartridge fan 147) to increase or adjust the flow rate of the working fluid in the closed-loop regeneration flow path through the solar thermal unit 110 and the lower housing assembly 130. During an unloading or release cycle, the working fluid can accumulate both heat and water vapor upon flowing through solar thermal unit 110 and efficiently release the accumulated water vapor upon flowing through lower housing assembly 130.

In some embodiments, exchange unit 142 and condenser 144 can be integrated or integrally formed, such that at least some structural components are formed or molded together, for example during the same manufacturing and/or assembly operation to form an integrated exchanger and condenser. In embodiments where at least a portion of the exchanger and condenser components are integrally formed, one or more benefits and advantages can be provided. For example, an integrated structure can provide a low profile or compact system. In some arrangements, integration of the exchanger component with the condenser component can reduce the overall thickness of the lower housing assembly (e.g., via a recessed rotary desiccant wheel exchange unit seated in a portion of the condenser component). In addition, an integrated assembly can provide easy access to components of the lower housing assembly that may need to be serviced, replaced or maintained in the field. Furthermore, such integrated configurations can help reduce the number of portions or components of the lower housing assembly and simplify the manufacture, maintenance, complexity and/or other aspects associated with making and using the lower housing assembly.

The exchange unit 142 can be a passive sensible heat transfer unit or component (e.g. a heat exchanger), a passive latent heat transfer unit or component (e.g. vapor transfer membrane), a passive total heat (i.e. sensible and latent heat) transfer unit or component (e.g. rotary desiccant wheel), or an active heat transfer unit or component (refrigeration unit, vapor compression cycling unit). In some implementations, both heat (i.e. sensible) energy and moisture (i.e. latent) energy is exchanged by exchange unit 142. In other implementations, only sensible heat is exchanged, for example with a conventional heat exchanger. Sensible heat can be transferred in the form of a temperature difference between one or more regeneration flow path segments via the exchange unit 142. Latent heat can be transferred in the form of a moisture difference between different regeneration flow path segments via the exchange unit 142. In some implementations, the exchange unit 142 can comprise a plurality of sub-units, for example a separate heat exchange sub-unit and a moisture exchange sub-unit.

In several embodiments, the exchange unit 142 can be configured to transfer energy (e.g., sensible energy, latent energy, or a combination thereof) between working gas exiting solar thermal unit (e.g., via port 128) in advance of condenser 144 and working gas exiting condenser 144 in advance of input to solar thermal unit 110 (e.g., via port 126)

in a closed loop regeneration flow path. The exchange unit 142 can be configured such that energy transfer occurs between the working fluid after uptake of water vapor by in the solar thermal unit 110 and the working fluid after condensation of water in the condenser 144. As an example, the exchange unit 142 can be configured to transfer heat from the working fluid exiting solar thermal unit 110 (e.g., via port 128) to the working fluid exiting condenser 144 such that the temperature of the working fluid is reduced prior to entering the condenser 144 and/or the temperature of the working fluid increases prior to entering solar thermal unit 110. As another example, the exchange unit 142 can be configured to transfer water vapor from the working fluid exiting the condenser 144 to the working fluid exiting the solar thermal unit 110 (e.g., via port 128) such that water vapor is retained within or directed towards the lower housing assembly 130 rather than being transported towards or return to solar thermal unit 110.

In various embodiments, an exchange unit (e.g., 142) is operatively coupled between a solar thermal unit (e.g., 110) and condenser (e.g., 144) so as to transfer energy between working fluid flowing between the solar thermal unit and the condenser. In various embodiments, an exchange unit transfers enthalpy, heat and/or moisture between the working fluid output from the solar thermal unit and the working fluid output from the condenser during an unloading cycle. For example, the exchange unit can transfer latent heat or moisture from the working fluid output from the condenser in advance of the solar thermal unit to the working fluid output from the solar thermal unit in advance of the condenser. As another example, the exchange unit can transfer sensible heat from the working fluid output from the solar thermal unit in advance of the condenser to working fluid output from the condenser in advance of the solar thermal unit.

In various embodiments, the exchange unit transfers enthalpy via an active enthalpy exchange mechanism, for example a rotary desiccant unit. In embodiments where the exchange unit comprises a rotary desiccant, the hygroscopic material in the solar thermal unit can be selected to have a higher water sorption capacity than the hygroscopic material of the rotary desiccant unit. Alternatively, or in addition, the hygroscopic material in the solar thermal unit can be selected to have a lower water sorption and/or desorption rate than the hygroscopic material in the rotary desiccant unit. For example, the hygroscopic material in the solar thermal unit can include a deliquescent salt that could provide a higher water sorption capacity than an oxide, clay or molecular sieve-based hygroscopic material of the rotary desiccant unit. As another example, the hygroscopic material in the rotary desiccant unit can include an oxide, clay or molecular sieve-based material that could provide a higher water sorption/desorption rate than a deliquescent salt in the hygroscopic material in the solar thermal unit. As yet another example, the hygroscopic material of the rotary desiccant unit can be selected to have a lower density than the hygroscopic material in the solar thermal unit.

In some embodiments, the lower housing assembly 130 comprises a water tank or storage reservoir for receiving produced water from the condenser 144 (e.g., via outlet 180) and including a dispensing outlet, for example located along a bottom portion of lower housing assembly 130 (storage tank and dispenser outlet not shown for clarity). Dispensed water can be similar to "mineral water" i.e., purified water with additive minerals. In various embodiments, system 100 comprises additional peripheral components to facilitate self-sufficient, compact and/or self-contained deployment including but not limited to onboard energy generation and/or energy storage systems, water treatment or mineralization units and/or the like.

System 100 includes a controller 170 configured to control system 100 to maintain a net flux of water vapor from the solar thermal unit 110 to the condenser 144, and thereby increase or maximize the production of water. Controller 170 can maximize the production of water at the condenser 144 by optimizing or adjusting the exchange rate of the exchange unit 142 (e.g., rate of rotation for a rotary desiccant, rate of enthalpy or heat transfer for a rotary desiccant or passive enthalpic exchange mechanism), the flow rate of the working fluid in the working fluid path (e.g., via fan 147) or a combination thereof. The control system can dynamically maximize the production of water over the diurnal cycle based on current or forecast ambient conditions (e.g., solar insolation, solar radiation, or solar irradiance, ambient temperature, ambient humidity), current or forecast system properties (e.g., working fluid temperature, working fluid humidity, water content of hygroscopic materials of the system, battery electrical charge status (e.g., onboard battery) or power availability of the battery, power availability from the PV panel). The control system can use a set of sensors (including but not limited to temperature sensors, moisture sensors, current sensors, Hall Effect sensors, anemometry and/or manometry, an onboard deterministic and/or machine learning algorithm, information regarding the thermodynamics of water vapor, information regarding the properties of the hygroscopic materials, information regarding the amount of water produced, information regarding the amount of water vapor retained by the thermal desiccant unit, and/or other factors that can be synthesized in the controller to optimize water production at the condenser.

Various approaches can be employed to control or maximize the production of water by system 100 by driving the water vapor captured by hygroscopic materials, composites or assemblies in the solar thermal unit 110 during the uptake or loading mode towards vapor pressure saturation in the working fluid during the unloading or release mode. For example, the exchange rate of the exchange unit 142 can be varied based on an ambient solar flux or irradiance, an ambient temperature, an ambient relative humidity, a temperature and/or relative humidity of the working fluid (at any respective node in the system), an amount of water present in hygroscopic material, composite or assembly in the solar thermal unit 110, an elapsed time, an electrical charge accumulated in the battery or power availability of the battery (e.g., battery 166), a user input and so on. Controller 170 can operate the system 100 based on one or more of: a user selection, data received from one or more sensors, forecast conditions, programmatic control, and/or by any other desirable bases. Controller 170 can be associated with peripheral devices (including sensors) for sensing data information, data collection components for storing data information, and/or communication components for communicating data information relating to the operation of the system. Inputs to controller 170 may be measured in that they are indicated in data captured by one or more sensors. In one example, the controller 170 can set process gas flow rates, working fluid flow or circulation rates, enthalpy exchange rates (e.g., rotation rate of rotary desiccant), transitions between load and release times based on a look up table of parameters stored onboard the controller. In yet another example, the controller can self-adjust process gas flow rates, energy exchange rates, load/release transition times and monitor water production signals in an effort to self-teach or learn optimum setpoints.

Controller 170 can be programmed or configured to control, adjust or maximize water production based on measurements of one or more inputs (e.g., such that controller 170 may increase water production based on current or expected environmental and system conditions) including but not limited to external conditions like ambient air temperature, ambient pressure, ambient air relative humidity, solar insolation, solar radiation, solar irradiance, solar flux, weather forecast, time of day, and so on. Furthermore, controller 170 can be programmed or configured to increase water production based on inputs relating to system operational parameters like working fluid temperature, working fluid pressure, working fluid relative humidity, working fluid water vapor partial pressure, condenser discharge temperature, water production rate, water production volume, water usage rate, water quality, onboard energy production or storage and so on. Various examples of control methods will be described in more detail below.

In embodiments where the solar thermal unit comprises a porous hygroscopic material, composite or assembly (e.g., at 118a, 118b), the system flow architecture in combination with the particular configuration, structure, porosity and materials can improve interaction or water transfer between the working fluid and the hygroscopic material, composite and/or composite assembly in the solar thermal unit.

FIG. 1-6 illustrate some implementations of water generation systems and related components. FIGS. 3-6 illustrate water generation systems including two hygroscopic layers or bodies in a solar thermal unit and a series flow architecture wherein process or regeneration gas flows through one hygroscopic body in advance of the other hygroscopic body, however other numbers of separate or distinct hygroscopic bodies in alternative configurations and/or flow architectures can be provided. Various examples of hygroscopic body or layer compositions configurations and flow architectures will be described in more detail below. In many embodiments, the composition, configuration and flow architecture of the hygroscopic material, composite and/or composite assembly is selected to improve interaction and/or water transfer between the process or working gas and the hygroscopic material for maximum water uptake from cool ambient air without weeping, swelling or other stability or degradation loss during a loading cycle and with an overall top-to-bottom heat transfer from upper portions of the solar thermal unit to the hygroscopic layers or bodies during unloading.

In various embodiments, a solar thermal unit is designed such that at least a portion of the heat absorbed from a top portion of the solar thermal unit comprises solar heat. In various embodiments, a solar thermal unit further comprises a photovoltaic panel and at least a portion of the heat absorbed from a top portion of the solar thermal unit comprises heat generated by the photovoltaic panel. Unless otherwise specified below, the numerical indicators used to refer to components in FIG. 7-10 are similar to those used to refer to components or features in FIG. 1-6 above, except that the index has been incremented by 100.

Figure 7A:
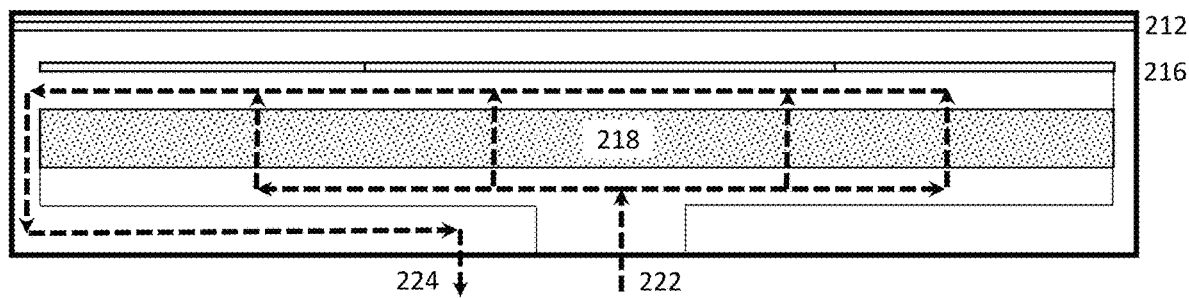
FIG. 7A illustrates a cross-sectional view of a process flow path in a solar thermal unit, according to an embodiment.
Figure 7B:
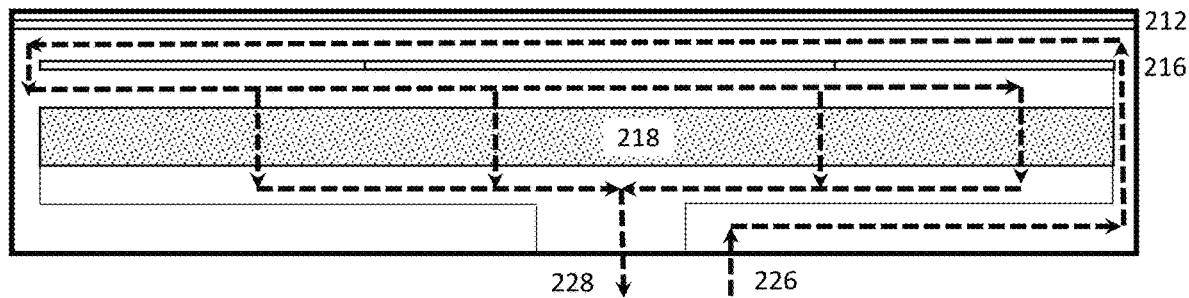
FIG. 7B illustrates a cross-sectional view of a regeneration flow path in a solar thermal unit, according to an embodiment.

FIG. 7A illustrates a cross-sectional view of a process flow path (indicated by dashed arrows) and FIG. 7B illustrates a cross-sectional view of a regeneration flow path (indicated by dashed arrows) in a solar thermal unit 210 including a single or main hygroscopic layer or body 218. As depicted in FIG. 7A, the process fluid comprising water vapor enters solar thermal unit 210 at inlet 222 and flows through the hygroscopic layer 218 to deposit water therein. As depicted in FIG. 7B, the working fluid flows first to an upper portion of solar thermal unit 210 to collect heat i.e., between glazing layer 212 and interstitial layer 216, and then is directed through the hygroscopic layer 218 before exiting at 228.

Because the efficiency and power usage of a solar thermal unit of the present technology may be affected by the flow of the working fluid through the solar thermal unit and the pressure drop across the fluid paths including the porous hygroscopic layers, bodies or assemblies within the unit, it may be desirable to minimize the pressure drop through the porous hygroscopic assembly and reduce the amount of power required to pump the working and regeneration gas through the system at a desired flow rate.

Figure 8A:
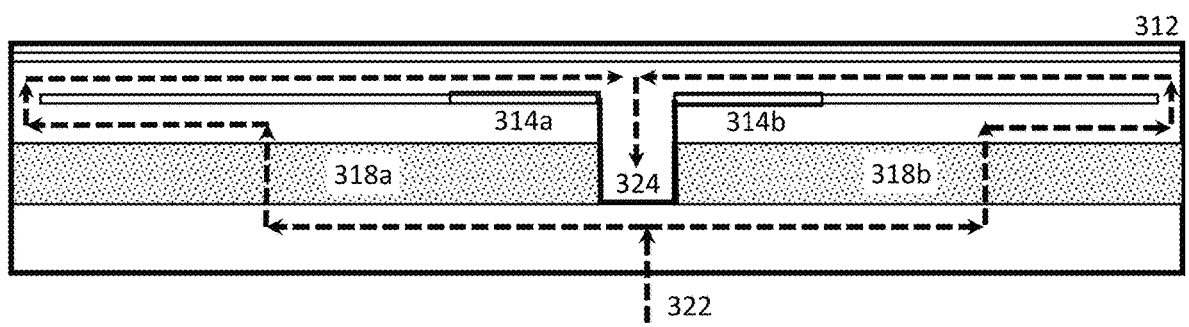
FIG. 8A illustrates a cross-sectional view of a process flow path in a solar thermal unit, according to an embodiment.
Figure 8B:
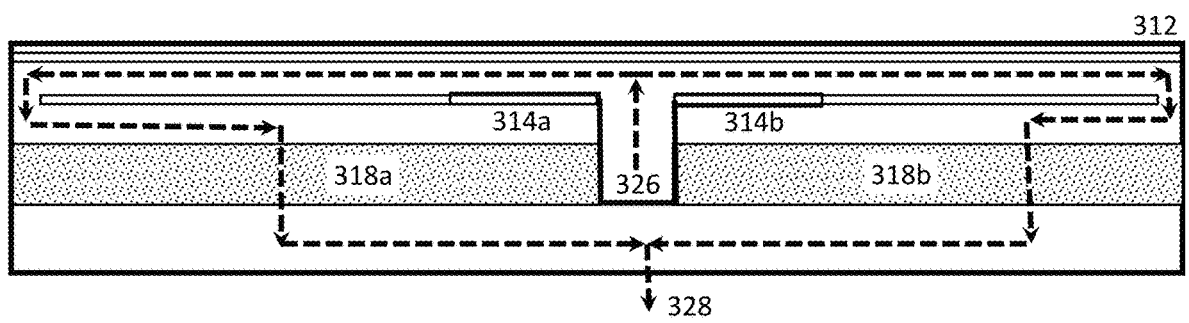
FIG. 8B illustrates a cross-sectional view of a regeneration flow path in a solar thermal unit, according to an embodiment.

In various embodiments, the fluid may be split between multiple flow paths to balance the pressure drop across the unit, and reduce the pressure drop as compared having only a single fluid path. As an example, FIG. 8A illustrates a illustrates a cross-sectional view of a process flow path (indicated by dashed arrows) and FIG. 8B illustrates a cross-sectional view of a regeneration flow path (indicated by dashed arrows) in a solar thermal unit 310 including separate or split hygroscopic composite assemblies 318a and 318b operating under a split flow architecture such that process and regeneration gas is split between the first hygroscopic composite assembly 318a and the second hygroscopic composite assembly 318b.

Figure 9A:
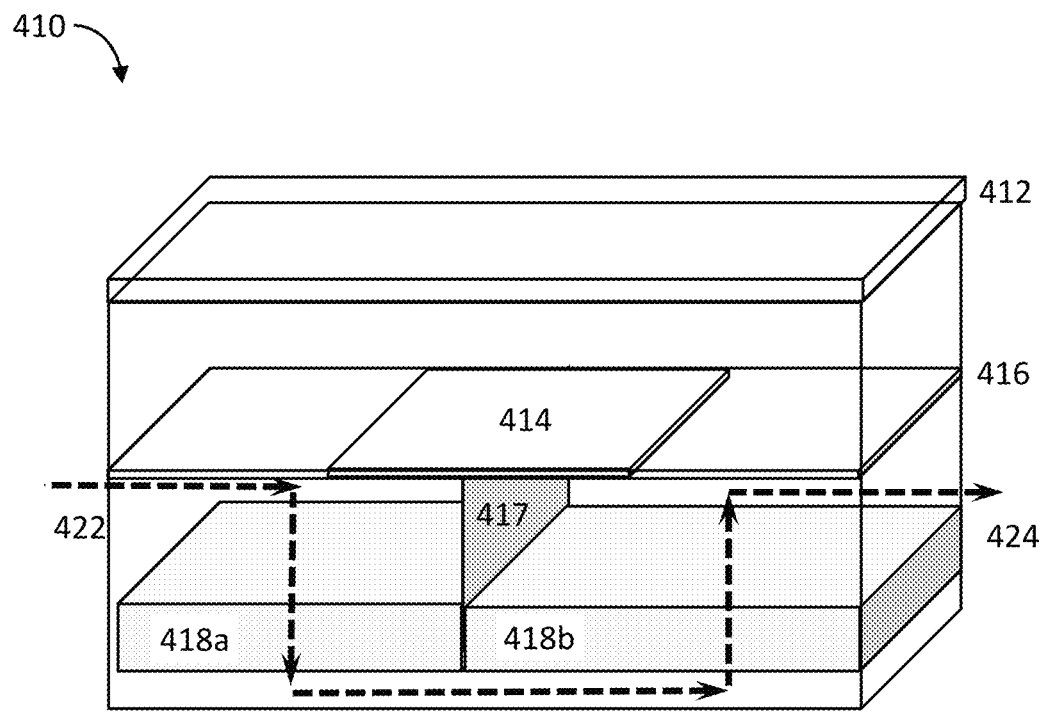
FIG. 9A illustrates a cross-sectional view of a process flow path in a solar thermal unit, according to an embodiment.
Figure 9B:
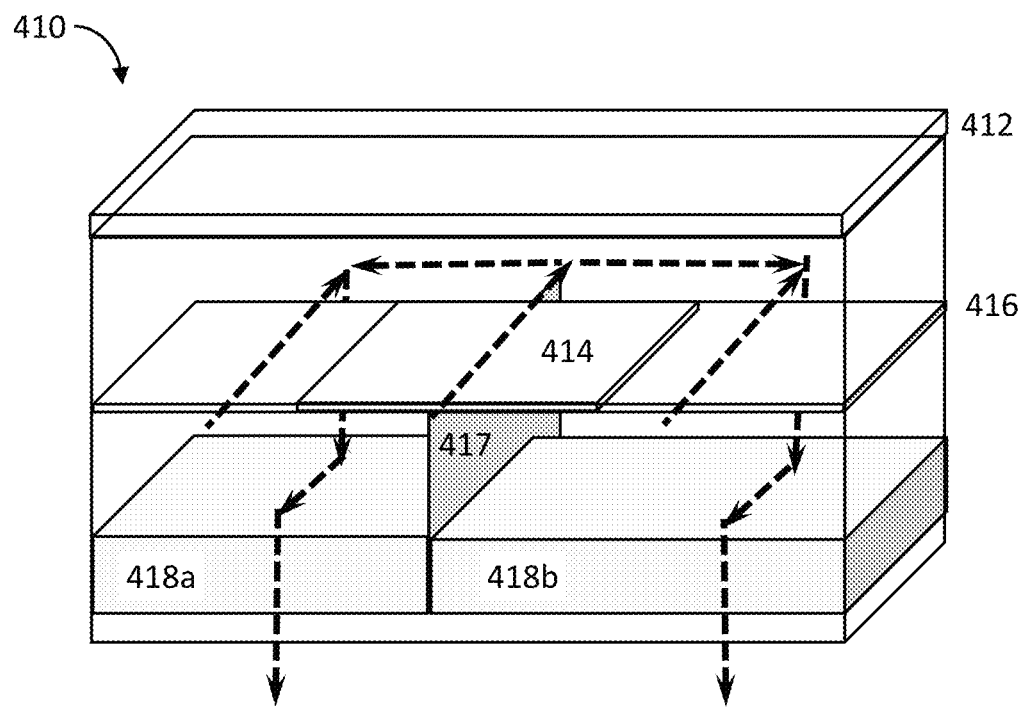
FIG. 9B illustrates a cross-sectional view of a regeneration flow path in a solar thermal unit, according to an embodiment.

As another example, FIG. 9A illustrates a perspective cross-sectional view of a series process flow path through two partitioned hygroscopic composite assemblies 418a and 418b and FIG. 9B illustrates a perspective cross-sectional view of a regeneration flow path including a cross flow path first between glazing layer 412 and interstitial PV panel 414 and then through two partitioned hygroscopic composite assemblies 418a and 418b. As depicted in FIG. 9B, the working fluid flows (in a path depicted by dashed arrows) first to an upper portion to collect heat, and then reverses direction to towards lower segmented portions defined by separator 417 to collect water and heat from hygroscopic composite assemblies 418a and 418b. In this way, the working fluid may efficiently transport absorbed solar heat from the upper layer of solar thermal unit 410 to maximize the water uptake from the hygroscopic material during the unloading cycle (FIG. 9B) while improving the interaction of the process gas with hygroscopic bodies 418a and 418b during the loading cycle (FIG. 9A).

In various embodiments, the hygroscopic composite assembly configuration and the flow architecture of the solar thermal unit 410 is configured to improve interaction of the process fluid with the hygroscopic material via serial exposure of the subdivided areas (e.g., 418a, 418b) to the same process fluid flow rate, thereby increasing flow flux of the process fluid during the load time. As depicted in FIG. 9A, the process fluid comprising water vapor enters solar thermal unit 410 and flows (in a path depicted by dashed lines) through the lower segmented bodies or layers 418a, 418b, under separator 417, to deposit water in the hygroscopic layers 418a and 418b. FIG. 9A-B depict a single separator, however any desirable number and configuration of fluid inlets, fluid outlets, separators or other flow directing means, structures or devices can be provided to improve interaction of the process gas with the hygroscopic material at a high process gas flux.

In an embodiment, various configurations of one or more hygroscopic layers, bodies or assemblies in the solar thermal unit can be provided to maintain a process gas flux preferably greater than 50 cubic feet per minute per square meter or (CFM)/m², greater than 100 CFM/m², greater than 200 CFM/m², greater than 300 CFM/m² or greater than 400 CFM/m² with a pressure drop less than 0.5 inches water, 0.3 inches water, less than 0.2 inches water, less than 0.15 inches water or less than 0.1 inches water. Furthermore, the hygroscopic bodies or layers in the solar thermal unit can be configured around and/or within flow separators, distributors, sectioned layers or segments according to favored flow paths for loading (i.e. water uptake) and/or regeneration (i.e. water release) operations to increase water generation. In an embodiment, the solar thermal unit comprises a hygroscopic composite assembly having a pore structure to maintain a gas flux through the hygroscopic composite with a pressure drop less than 0.2 inches water at a flow gas flux greater than 200 CFM/m².

The solar thermal unit 410 shown FIG. 9B depicts the working fluid path being introduced into the solar thermal unit at approximately perpendicularly (i.e., at about a 90 degree angle) relative to the process fluid path, and depicts a single separator 417 to maintain the desired top down flow of the working fluid, however any desirable configuration (e.g., spacing, placement, relative angles, etc.) and/or number of fluid inlets, fluid outlets, separators or other flow directing means, structures or devices can be provided to define the process and working fluid flow paths in the solar thermal unit for load and/or release operations. Furthermore, various flow approaches can be employed including flow-through hygroscopic body implementations, flow-over or flat plate implementations, as well as their combinations or derivatives. In addition, the hygroscopic material can be configured in various ways relative to the flow directing means, structures or distributors, for example but not limited to lattice structures, rigid porous plates, inter-corrugated fluidic channels, and/or woven and fiber meshes to sustain back pressure and distribute the flow.

Figure 10A:
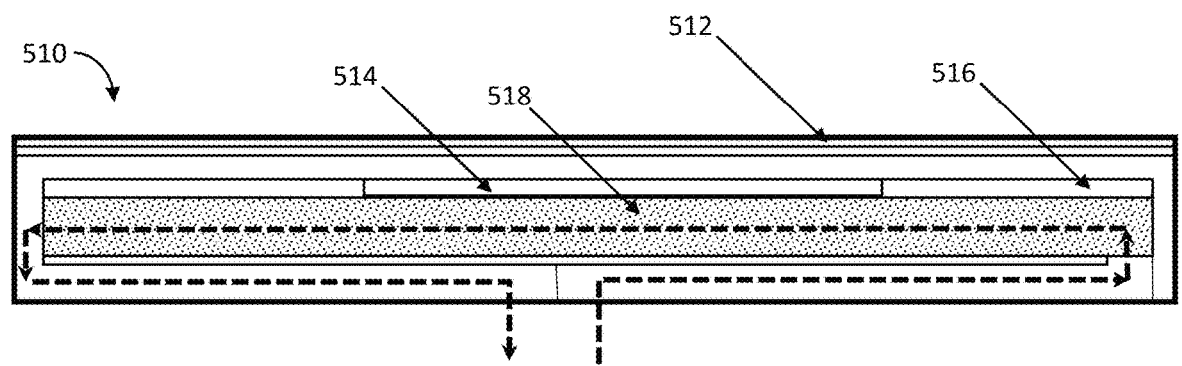
FIG. 10A illustrates a cross-sectional view of a process flow path in a solar thermal unit, according to an embodiment.
Figure 10B:
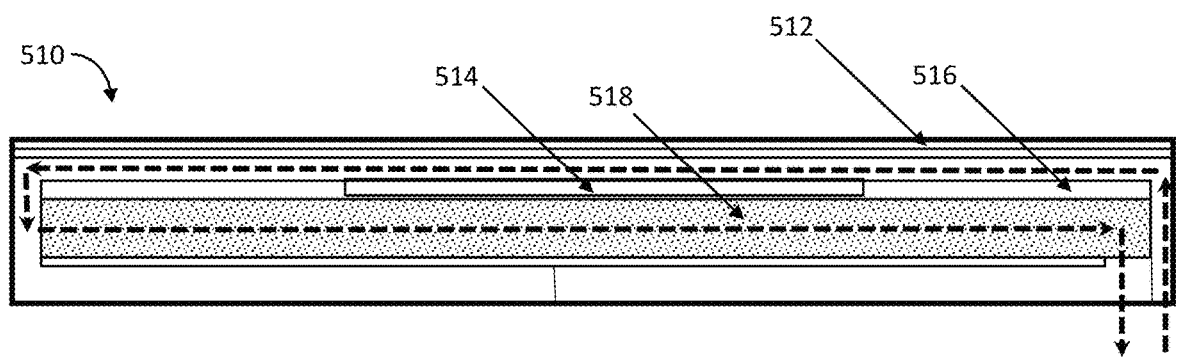
FIG. 10B illustrates a cross-sectional view of a regeneration flow path in a solar thermal unit, according to an embodiment.

The hygroscopic composite assembly can be provided as a self-supporting structure so as to at least partially provide the structural elements and mechanical robustness of a solar thermal unit. As an illustrative example, FIG. 10A illustrates a illustrates a cross-sectional view of a process flow path (indicated by dashed arrows) and FIG. 10B illustrates a cross-sectional view of a regeneration flow path (indicated by dashed arrows) in a modular solar thermal unit 510 including a hygroscopic composite assembly 518 provided adjacent to a rear surface of a photovoltaic (PV) layer or panel 514 and an interstitial layer 516 (e.g., transparent glass panel). In some embodiments, the PV panel can span the entirety of the hygroscopic composite layer 518. As depicted in FIG. 10A, a process gas comprising water vapor enters solar thermal unit 510 and flows through the hygroscopic composite assembly 518 to deposit water therein during a loading operational cycle. As depicted in FIG. 10B, the working fluid flows first to an upper portion of solar thermal unit 510 to collect heat i.e., between glazing layer 512 and a front surface of PV panel 514, and then is directed through the hygroscopic composite assembly 518 positioned at the rear surface of PV panel 514, 516. In an embodiment, the hygroscopic layer or assembly 518 can be configured to be fully or at least partially in physical contact with a rear surface of PV panel 514.

In an embodiment, a hygroscopic material, composite or composite assembly can be provided on the backside or rear surface of a PV panel and/or interstitial glazing layer so as to architect a heat transfer network wherein solar irradiation on the PV panel and/or interstitial layer is conducted as heat into the hygroscopic absorber matrix (e.g., 518) to efficiently evaporate water vapor to the regeneration gas flowing in the regeneration flow path. In this approach, the PV panel and/or interstitial glass surfaces can be evaporatively cooling during the unloading or water release operation. In various embodiments, the properties of the hygroscopic material, composite or assembly (e.g., hygroscopic salt content, porosity and the like) and/or the operational setpoints (e.g. rate of regeneration gas flow through solar thermal unit) can be controlled to improve the efficiency of the water generation system.

The hygroscopic material, composite and/or or composite assembly may withstand high temperature (e.g., 120-150° C.) cycling between load and unloading cycles of a water generation system. Durable water generation systems of the present technology can provide continuous water capture/release cycling over thousands of cycles, e.g., continuous diurnal cycling over a 20-year lifetime can represent over 7,000 cycles of diurnal loading at nighttime hours and water release during daytime hours. As such, the hygroscopic material, composite and composite assembly may be configured for have long-term cycling stability without loss of mechanical stability or sorption capacity. Furthermore, the hygroscopic materials or components may remain in solid phase and/or maintain full retention of liquid phase within the composite assembly throughout continuous sorption/desorption cycling. In addition, constituents or components of the hygroscopic composite assembly may be selected for and configured to be chemically stable with other hygroscopic composite assembly components or to constituents of the process or regeneration gas (e.g., oxygen).

The hygroscopic composite assembly is also configured to have a low density, high water sorption capacity and an open pore structure without closed throats and with pore sizes on the order of microns to millimeters for facile sorption. The sorption kinetics of the hygroscopic material, composite and composite assembly may leverage a diurnal water vapor loading cycle without compromising total water storage capacity. The sorption capacities of the hygroscopic material, composite or assembly may be configured to maintain a high water storage capacity across global average nighttime atmospheric air conditions. Furthermore, the desorption kinetics of the hygroscopic material, composite or assembly may be selected for the global average of solar insolation magnitude and exposure time (e.g. 6 kWh/m², 1 kW/m² peak solar radiation for 8 peak sun hours). In one example, a hygroscopic material, composite or assembly is selected to uptake 30-300% of its own mass as water vapor.

In some embodiments, a hygroscopic composite, assembly or body can be provided as one or more layered structures, a packed bed including hygroscopic components, particles or beads or a substantially continuous or monolithic porous composite structure. Additionally, a composite assembly doesn't necessarily itself need to be a composite in the traditional sense, rather it can be provided as a loose pack or packed bed assembly with a supporting frame. Furthermore, a porous hygroscopic body or layer can include one or more light absorbing or light activated materials. In one example, a hygroscopic composite can include hygroscopic particles agglomerated via a binder and/or dispersed in a high surface area matrix, support medium or substrate. The hygroscopic material, support substrate, composite and/or assembly can be selected to minimize reflection of solar radiation and improve absorption and conduction of thermal energy. For example, the hygroscopic material, support substrate, composite and/or assembly can be dark or black in color. In some embodiments, the hygroscopic material, support substrate, composite and/or assembly can be mixed, combined and/or embedded with materials or structures to efficiently absorb and/or transfer heat. For example, the hygroscopic material or composite can be dispersed around a metallic structure with a thermal conductivity greater than 50 W/mK. In other embodiments, the hygroscopic composite is a self-supporting structure housed within the solar thermal unit.

Hygroscopic composites and composite assemblies of the present systems can comprise various components or constituents in a number of varied configurations (e.g., such that the hygroscopic composite is capable of continuous adsorption and desorption of water vapor). The following description of hygroscopic composites and composite assemblies is provided by way of example. In some implementations, a hygroscopic composite assembly is capable of sorption at a first temperature, relative humidity and/or pressure and desorption at a second temperature, relative humidity and/or pressure. The components of the hygroscopic composite assembly can be provided as a liquid, solid, and/or combinations thereof. The hygroscopic composite can be provided as a porous solid substrate impregnated with hygroscopic materials. For example, the hygroscopic material may comprise one or more materials selected from the group consisting of: silica, silica gel, alumina, alumina gel, montmorillonite clay, zeolites, molecular sieves, metal-organic frameworks, activated carbon, metal oxides, lithium salts, calcium salts, potassium salts, sodium salts, magnesium salts, phosphoric salts, organic salts, metal salts, ionic liquids, carbon, glycerin, glycols, hydrophilic polymers, polyols, polypropylene fibers, cellulosic fibers, derivatives thereof, and combinations of thereof. In some embodiments, the hygroscopic composite comprises a metal organic framework (MOF), for example UiO-66(Zr), CAU-1(Al), MIL-101(Cr), MIL-101(Al), MIL-53(Al), MIL-53(Cr), Al fumarate, derivatives thereof or combinations thereof.

In some embodiments, the hygroscopic material can be selected and/or configured to avoid sorption of certain molecules (e.g., those molecules that may be poisonous when consumed by a human). The term "sorption," as used herein, refers to absorption, adsorption or a combination thereof.

In various embodiments, the hygroscopic material, composite and/or assembly can include liquid or deliquescent components combined with retention or support substrates in a ratio determined by a maximum water uptake after a diurnal loading cycle in high relative humidity ambient air conditions (e.g. >40% RH, >60% RH, >80% RH). In various implementations, the hygroscopic composite comprises a hygroscopic salt, for example a deliquescent salt. Hygroscopic salts of the present disclosure can be selected from the group of potassium carbonate, calcium chloride, sodium chloride, lithium chloride, sodium carbonate, magnesium chloride, magnesium sulfate, potassium bromide, sodium sulfate, derivatives thereof or combinations thereof. In some embodiments, a combination of deliquescent salts can be dispersed on a support substrate. For example, a combination of calcium chloride and sodium chloride can be dispersed on a support substrate, with calcium chloride acting as a vapor uptake reservoir at low relative humidities and sodium chloride acting as a differential vapor pressure buffer at mid-range relative humidities. In some embodiments, the hygroscopic composite comprises a hygroscopic salt dispersed on a support substrate. For example, the hygroscopic composite can include a hygroscopic or deliquescent salt in an amount greater than 10% and less than 50% by weight of the total weight of the first hygroscopic composite. The amount of hygroscopic or deliquescent salt dispersed on a substrate can be selected based on its sorption/desorption kinetics for a diurnal water vapor loading/unloading cycle to facilitate water production and avoid weeping, swelling or other stability losses and/or improve system water production. It can be preferable to decrease or minimize the weight of the hygroscopic composite and the hygroscopic assembly, so the hygroscopic material or salt content can be increased to an upper limit set by weeping, swelling or other stability concerns and/or water production. A weeping, swelling or instability condition or state can occur when a hygroscopic composite absorbs a high enough amount of water to begin forming an aqueous solution and can irreversibly drive migration of a hygroscopic material from the pores or retaining surface features of a support substrate. Furthermore, a weeping, swelling or instability condition or state can increase the pressure drop through the hygroscopic composite or composite assembly and present a degradation or failure mode for the water generation system. As will be described in more detail below, an operational or cycling safety limit can be set before the onset of weeping, swelling or other instability to avoid system degradation or failure and/or improve the efficiency of water production. In some preferred implementations, the hygroscopic composite can include a hygroscopic salt in an amount greater that 20% and less than 30% by weight, or greater that 24% and less than 28% by weight, of the total weight of the hygroscopic composite such that the hygroscopic composite or body maintains a high water storage and release capability across global average diurnal atmospheric air conditions.

For illustrative purposes, various control approaches for efficient operation of a water generation system are described herein with regards to utilizing a hygroscopic salt or other hygroscopic material with a weeping potential, including system cycling between a weeping condition (i.e. an upper bound or limit of water content) and a low vapor pressure condition (i.e. a lower bound or limit for water content). However, a similar control approach can be employed for any material system having same or similar lower bound or limit and/or upper bound limit. Furthermore, additional or alternative water uptake and/or release cycling limits may exist depending on the particular material employed. For example, some materials used in water generation systems may have upper bound limits relating to swelling with excess water loading which can cause excess pressure drops in a water generation system. As another example, some material used in water generation systems may have stability issues at high water loading conditions, for example a metal organic framework can swell at higher water contents which can degrade cycling stability of the water generations system. Thus, the material design and control approaches described herein can be modified such that additional embodiments may be realized with operational, logical, chemical, and mechanical changes may be made without departing from the spirit and scope of the disclosure.

In an embodiment, a higher salt content in the hygroscopic composite can support sorption of a greater amount of water, however a higher salt content can also trigger a weeping, swelling or instability condition at lower total water loads and/or process gas relative humidities. Furthermore, at lower ratios of absorbed water to hygroscopic salt, the hygroscopic composite can bind water more strongly and as such, more energy can be required to desorb the 'lower-grade' or more strongly bound water during an unloading cycle. In other words, the water vapor pressure of the hygroscopic composite at a higher water content (e.g. at the beginning of an unloading cycle) may require less energy to desorb (i.e. has a lower binding energy) and the water vapor pressure of the hygroscopic composite at a lower water content (e.g. towards the end of an unloading cycle) may require more energy to desorb (i.e. has a higher binding energy).

Figure 11:
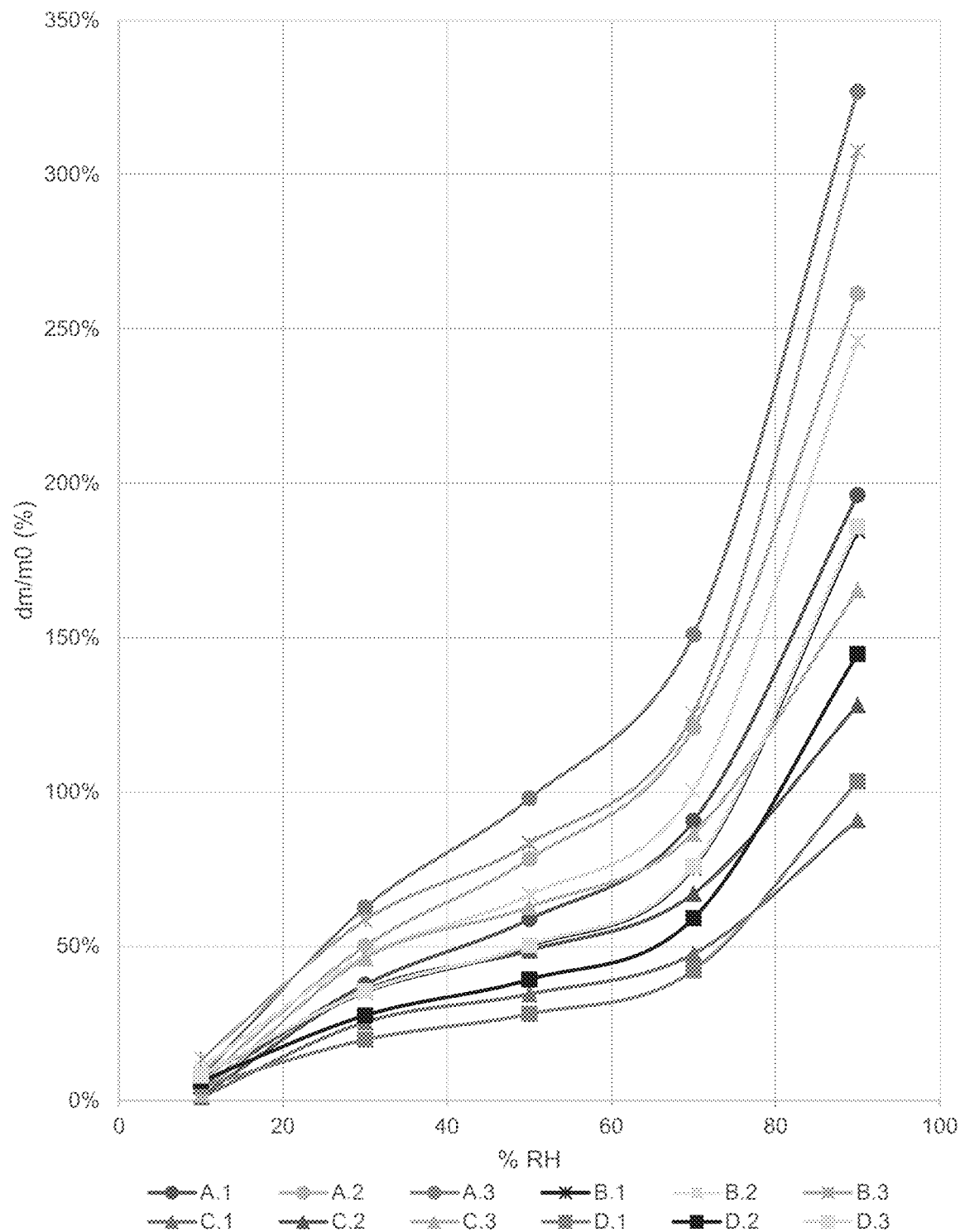
FIG. 11 shows isotherm plots for hygroscopic composites for a water generation system, according to an embodiment.

As an example, FIG. 11 shows isotherm plots at 25° C. for a set of hygroscopic composites for use in a water generation system. The isotherm plots show mass % water uptake (m/m0) with increasing salt content for a hygroscopic composite of a first type (A.1 at low wt % salt, A.2 at a mid wt % salt and A.3 at high wt % salt); a hygroscopic composite of a second type (B.1 at low wt % salt, B.2 at a mid wt % salt and B.3 at high wt % salt); a hygroscopic composite of a third type (C.1 at low wt % salt, C.2 at a mid wt % salt and C.3 at high wt % salt); and a hygroscopic composite of a fourth type (D.1 at low wt % salt, D.2 at a mid wt % salt and D.3 at high wt % salt). As shown, for all hygroscopic composite types, an increasing amount of salt content increases the amount of water uptake or loading, however the selection of hygroscopic composite type can facilitate operation within a desired range of water production conditions for a water generation system, e.g. global average ambient relative humidities.

In various embodiments, it can be preferable to avoid or minimize reaching a 'low-grade' water condition wherein the thermodynamic state of the water in the hygroscopic composite or composite assembly is at a relatively low equilibrated RH because operating at lower equilibrated water content or water vapor pressure states in the hygroscopic composite can require more energy to extract residual or remaining water in the hygroscopic composite or composite assembly. One approach to minimize the amount of energy required to extract water from the hygroscopic composite is to increase the salt content of the hygroscopic composite, however there is an increased driving force towards a weeping, swelling or unstable condition. However, the water generation system can operate such that one or more properties of the hygroscopic composite in the solar thermal unit (e.g., deliquescent salt mass %, porosity, salt type, and/or the like) can be used to determine a system operational setpoint (e.g., setting a residual water limit or lower unloading limit during and unloading cycle, setting a weeping threshold limit, swelling threshold limit, instability limit or upper loading limit during a loading cycle, and/or the like). As will be described in more detail below, the present technology can combine a hygroscopic composite and/or composite assembly design approach with an operational control approach to avoid weeping, minimize operation at low vapor pressures (i.e., minimize the amount of energy needed to desorb water), thereby improving system efficiency to produce water.

Figure 12:
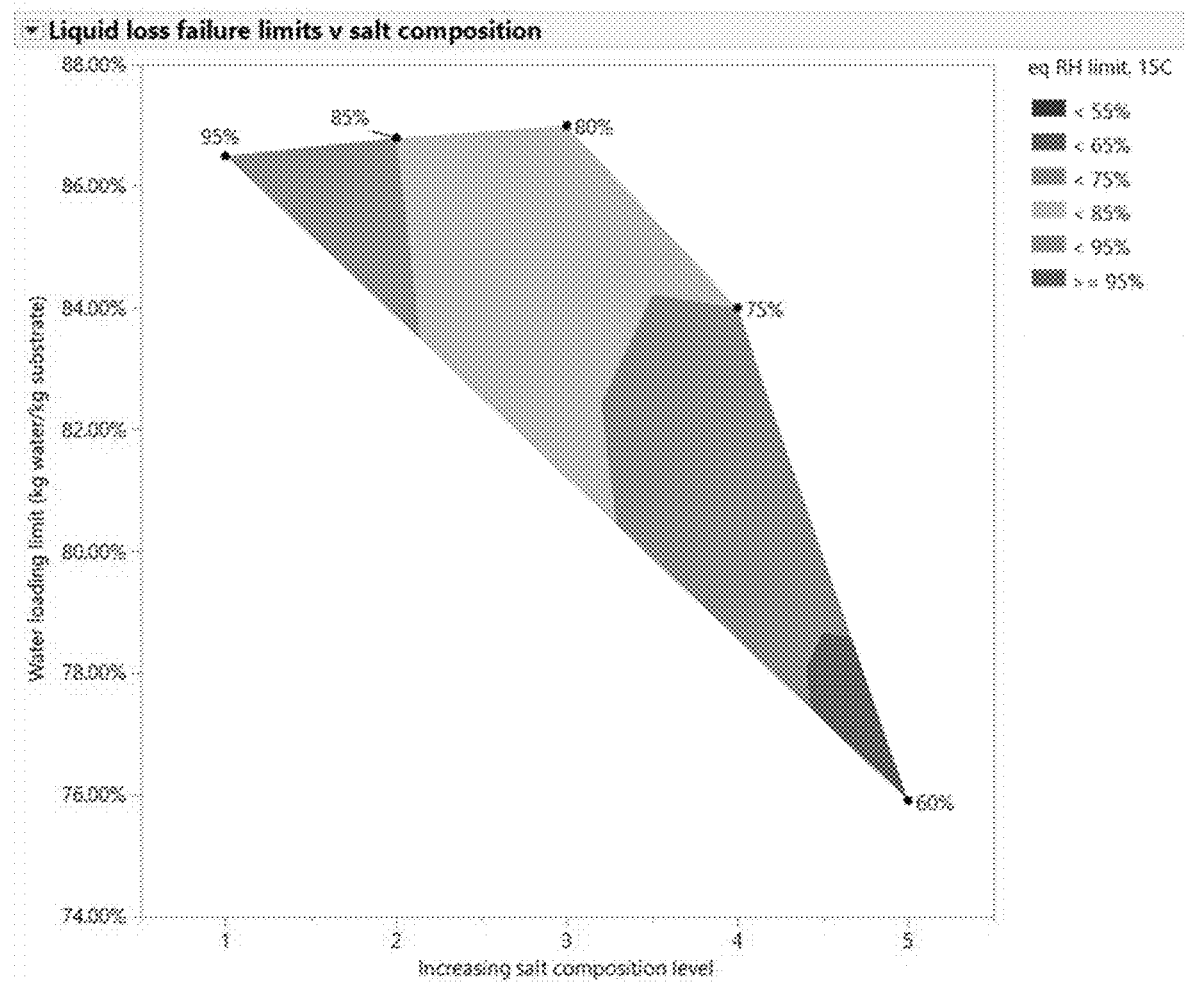
FIG. 12 shows a contour plot of water loading limit for increasing salt content of a hygroscopic composite, according to an embodiment.

To illustrate the variations in weeping or instability condition for a selected hygroscopic composite and the associated control approach, FIG. 12 shows a contour plot of weeping threshold failure limit or water loading limit (kg water uptake/kg substrate) for increasing salt composition of a hygroscopic composite. For each salt composition level (increasing from 1 to 5), the % relative humidity (% RH) at which weeping is observed (for a partial isotherm at 15° C.) is indicated at the upper portion of the contour plot. The contour shading is extrapolated to show an equivalent total water loading in the hygroscopic composite assembly. The equivalent water loading limit is a weeping failure limit which should be avoided during operation of the water generation system. As such, a weeping threshold indicated as an equilibrated RH limit (at 15° C. in this example for illustration) can be used to set an operational control setpoint e.g., the system controller can cease water loading of the hygroscopic composite if the equilibrated RH limit is reached.

As shown in the plot of FIG. 12, as the salt content increases, there is a decrease in the total amount of water the hygroscopic composite is capable of storing before weeping, swelling or becoming unstable. This may be, at least in part, due to additional salt not being dispersed into the interior of the support substrate but rather building up on external substrate surfaces meaning captured water may not be entrained in the hygroscopic composite such that weeping occurs at a lower water content. Alternatively or in addition, this may be, at least in part, due to swelling of the structural framework of the hygroscopic material such that captured water may not be encapsulated in the hygroscopic composite such that swelling occurs at a lower water content. In an embodiment, it can be preferable to operate a water generation system with a hygroscopic composite in a mid-range of salt composition to avoid reaching a weeping, swelling or other unstable condition while maintaining a high level of water production. Additionally, there can be an efficiency loss if the salt content is too high because a higher ratio of salt to entrained water in the hygroscopic composite can require more energy to release during an unloading cycle, i.e. it is preferable to operate an unloading cycle with a high ratio of water to salt content for the efficient use of thermal energy from the solar thermal unit.

In various embodiments, the hygroscopic composite comprises a hygroscopic salt or material dispersed on a substrate. The substrate can captively entrain the hygroscopic salt such that substrate retains or encapsulates the hygroscopic salt within its pore structure to facilitate stable loading/unloading cycling. The substrate and the dispersion of a deliquescent salt thereon can be selected to regulate a weeping, swelling or unstable state wherein moisture builds up on the surface of the hygroscopic composite in the form of droplets. The water generation system can operate such that one or more properties of the hygroscopic composite and/or composite assembly, for example a deliquescent salt to substrate ratio, can be used to determine a system operational setpoint, for example a loading cycle operational setpoint to avoid a weeping, swelling or unstable condition or state.

The hygroscopic composite can include a support substrate having a high surface area, a low density and a hierarchical and/or open pore structure. For example, the hygroscopic material, composite, support media and/or support substrates can be selected to have surface areas greater than 300 square meters per gram. Furthermore, the hygroscopic composite and/or support substrate can have a pore structure that is hierarchically porous, e.g. microporous, mesoporous and microporous with pores ranging from about <2 nm to about 50 micron and up to the millimeter scale. In an embodiment, the support media or substrate is in particulate form, and the average particle diameter of the particulates can be in the range of about 2 mm to about 10 mm. Non-limiting examples of substrates of hygroscopic composites described herein include perlite, expanded vermiculite, expanded clay, phyllosilicate clay, carbon fibers, activated carbon, graphite, expanded graphite, porous silica, porous alumina, derivatives thereof and combinations thereof.

In an embodiment, the hygroscopic composite can include a hierarchically structured pore matrix with a significant portion of macropores to serve as efficient transport paths. As an example, the hygroscopic composite can include an activated carbon selected as a deliquescent salt composite substrate that minimizes the weight of the hygroscopic composite while maximizing water uptake and kinetic rates of the hygroscopic composite. There is wide variation in microstructural characteristics of activated carbons dependent on their precursor type. The particular activated carbon structure should be selected for high mass transport rates of water vapor within the composite and for high sorption kinetic rates as well as provide facile impregnation of the substrate with a hygroscopic salt solution.

In an embodiment, the hygroscopic composite assemblies can include a polymeric binder in an amount greater than 1% and less than 25% by weight of the first hygroscopic composite, or preferably greater than 5% and less than 55% by weight of the first hygroscopic composite. For example, the polymeric binder can be a thermoplastic polymer having a melting temperature greater than 200 degrees Celsius. In other embodiments, the hygroscopic composite assembly comprises a thermosetting polymer. Hygroscopic composite assemblies of the present technology can comprise a polymer selected from the group consisting of polyepoxides, polyamides, polyolefins, polyesters, polyacrylates, polyvinyl halides, polyvinyl alcohols, polyacrylonitriles, polyurethanes, polysulfones, and derivatives or combinations thereof.

Additional examples of thermoplastic resins that can be included in the hygroscopic composite assemblies include polyesters such as polyethylene terephthalate (PET), polybutylene terephthalate (PBT); polyolefins such as polyethylene (PE), polypropylene (PP), and polybutylene; styrenic resin; polyoxymethylene (POM); polyamide (PA); polycarbonate (PC); polymethylenemethacrylate (PMMA); polyvinyl chloride (PVC); poly(phenylenesulfide) (PPS); polyphenylene ether (PPE); modified PPE; polyimide (PI); polyamideimide (PAI); polyetherimide (PEI); polysulfone (PSU); polyethersulfone; polyketone (PK); polyetherketone (PEK); polyetheretherketone (PEEK); polyetherketoneketone (PEKK); polyarylate (PAR); polyethernitrile (PEN); phenolic resin; phenoxy resin; fluorinated resin such as polytetrafluoroethylene; thermoplastic elastomers such as polystyrene type, polyolefin type, polyurethane type, polyester type, polyamide type, polybutadiene type, polyisoprene type and fluoro type; copolymers thereof; modifications thereof; and combinations thereof. Moreover, other elastomers or rubbers can be added to the above thermoplastic resin to improve their mechanical strength.

In an embodiment, a hygroscopic composite assembly has a mechanical stability such that it is capable of being self-supporting. For example, a hygroscopic composite assembly can be provided as a fiber-reinforced composite comprising carbon fiber, fiber glass, woven fibers or combinations thereof. For example, the hygroscopic composite assembly can be provided with a tensile strength greater than 50 MPa, 100 MPa or 200 MPa.

In an embodiment, a hygroscopic composite assembly comprises an interconnected open porous structure having a porosity of at least 5%, or in the range of 5-30% open porosity. In one non-limiting example, the hygroscopic composite assembly has a pore structure of a range of pore sizes including pore sizes ranging from about 1 mm to 5 mm to maintain a gas flux greater than 50 CFM/m$^2$, greater than 100 CFM/m$^2$, greater than 200 CFM/m$^2$, greater than 300 CFM/m$^2$ or greater than 400 CFM/m$^2$ with a pressure drop less than about 0.5 inches water, 0.3 inches water, 0.2 inches water, 0.15 inches water or 0.1 inches water. In a preferred embodiment, the composite assembly has a pore structure to maintain a gas flux through the hygroscopic composite with a pressure drop less than about 0.2 inches water at a flow gas flux of greater than about 200 CFM/m$^2$.

It can be preferable that a hygroscopic composite assembly is chemically, structurally, thermally and psychometrically stable at conditions the water generation system experiences so as to maintain water uptake and water release capabilities over consecutive loading and unloading cycles. As one non-limiting example, the hygroscopic composite assembly has an equilibrium water uptake capacity greater than 0.3 grams water per gram of hygroscopic composite at a 60% RH and 25 degrees Celsius atmospheric condition. As another non-limiting example, the hygroscopic composite assembly uptakes water at a rate greater than 0.1 grams water per gram of hygroscopic composite per minute at 60% RH, 25 degrees Celsius atmospheric condition, and a process gas flow of 60 cubic centimeters per minute.

Various methods can be used to produce or process hygroscopic composites of the present technology including but not limited to simple mixing, spray coating, dry mixing, blending, impregnation, incipient wetness method, similar derivate methods and a combinations thereof can be used to form hygroscopic composites.

In embodiments where the hygroscopic composite assembly comprises thermosetting resin or thermoplastic resin, thermoplastic resins can be preferable given molded assemblies can be manufactured effectively by molding process such as press molding and injection molding in addition to improved impact strength.

The carbon fiber reinforced resin composition or molding compounds of the present invention can be molded with a molding process, such as injection molding (injection compression molding, gas assisted injection molding and insert molding for example), blow molding, rotary molding, extrusion molding, press molding, transfer molding (Resin Transfer (RTM) Molding, Reaction Injection (RIM) Molding and Seemann Composites Resin Infusion Molding Process (SCRIMP) molding for example), filament winding molding, autoclave molding and hand lay-up molding for example. In various embodiments, a preferred molding process is injection molding with high productivity.

From the aspect of moldability, economical manufacturability, mechanical properties and heat resistance, at least one thermoplastic resin selected from the group consisting of polyamide resin, styrenic resin, polycarbonate resin, polyphenylene ether resin, polyester resin, poly (phenylene sulfide) resin, polyolefin resin, liquid crystal resin, phenolic resin can be used. At least one thermoplastic resin selected from the group consisting of polyamide resin, polycarbonate resin, styrenic resin and polyester resin can be preferable. If resins with melting temperature equal to or above 200° C. is used, the hygroscopic composite assembly can have a high mechanical stand cycling stability.

In various embodiments, water generation system of the present technology includes a controller (e.g., 170) that can operate the water generation system between a plurality of operational modes, for example over the course of a diurnal cycle and/or in response to environmental conditions. The controller can operate the system in a loading operational mode or cycle wherein the solar thermal unit captures water vapor from a process gas (e.g., ambient air) upon flow in the process flow path through the solar thermal unit. Additionally, the controller can operate the system in a regeneration or unloading operational mode or cycle wherein a working fluid (e.g. air) accumulates heat and water vapor upon flow in a regeneration flow path through the solar thermal unit. Upon output of the working gas from the solar thermal unit, water vapor from the working fluid can be condensed to form water. In various embodiments, energy can be exchanged between regeneration flow path segments.

Figure 13:
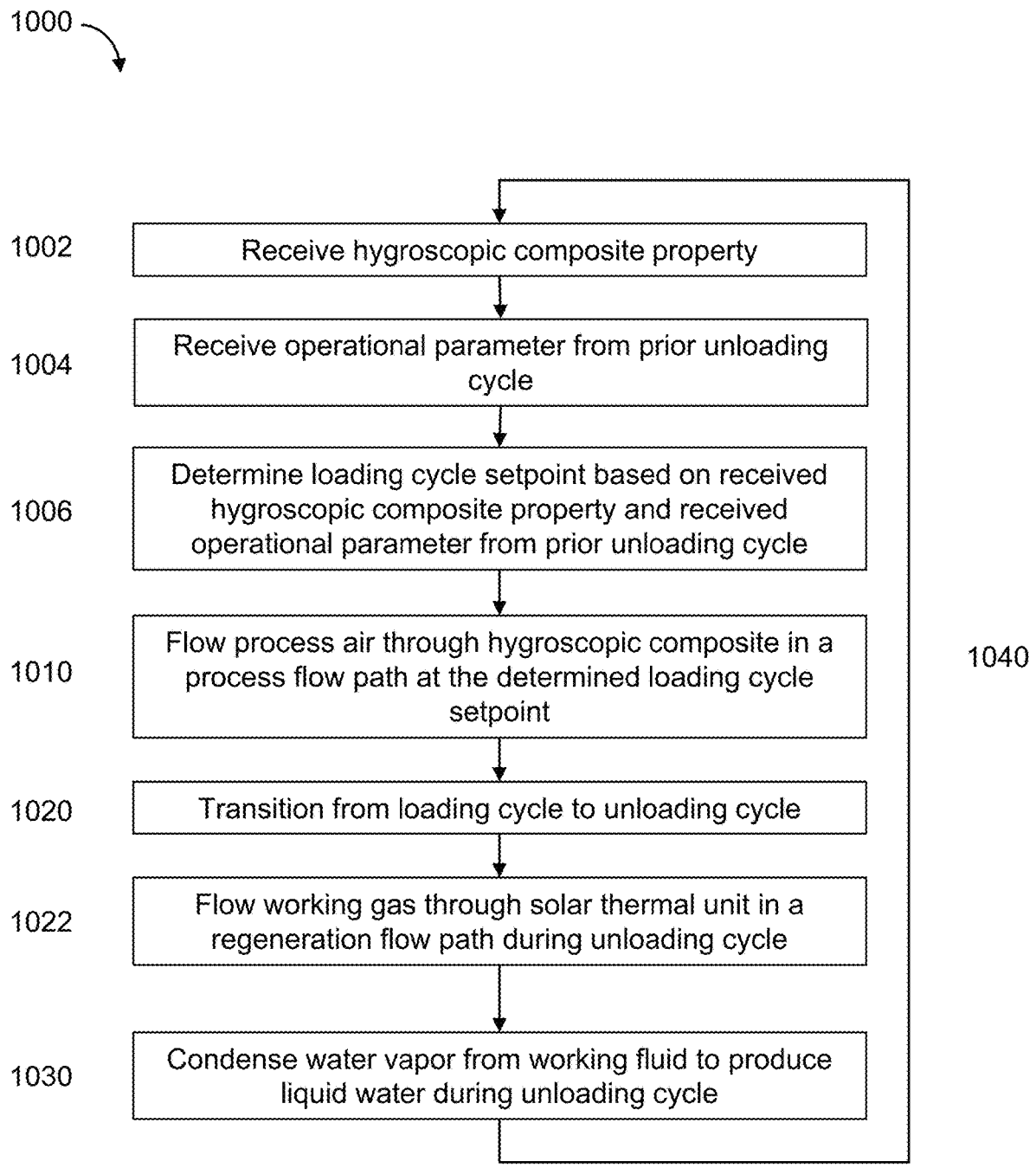
FIG. 13 illustrates a method of operating a water generation system, according to an embodiment.

The present disclosure further provides methods or processes operating a system for generating water from air. Referring to FIG. 13, a flowchart 1000 of a method of operating a water generation system is shown in accordance with an embodiment of the present disclosure.

At operation 1002, a system controller can receive a hygroscopic composite property of a hygroscopic material, composite and/or assembly in a solar thermal unit. For example, the hygroscopic composite property can include a hygroscopic material type, a hygroscopic salt content, a hygroscopic composite porosity, a composite assembly porosity, a hygroscopic composite weeping threshold, a hygroscopic composite swelling threshold, a hygroscopic composite instability threshold, or combinations thereof. In an embodiment, the hygroscopic composite property is a constant or static parameter or set of coefficients that does not change over the course of load/unload cycling. In some embodiments, the controller can receive a property of the hygroscopic material, composite and/or assembly as part of or during system commissioning which can then be set or remain unchanged over the course of system operation, and therefore in some implementations, operation 1002 can be optional during system operation. In other embodiments, the controller can receive updated information regarding a property of the hygroscopic material, composite and/or assembly over the course of system operation.

At operation 1004, a system controller can receive or determine an operational parameter from a prior and/or current unloading cycle of the solar thermal unit. For example, the controller can receive or determine an amount or total volume of water produced by the condenser in a prior and/or current unloading cycle, an environmental condition during the prior unloading cycle, an amount of solar energy or solar irradiation in the prior and/or current unloading cycle, a system power state, a system battery state of charge, or combinations thereof.

At operation 1006, a system controller can determine a loading operational setpoint based on the received hygroscopic composite property from operation 1002 and the received or determined operational parameter from prior and/or current unloading cycle at operation 1004. For example, the controller can determine a loading cycle setpoint relating to a maximum water uptake limit of the hygroscopic composite or composite assembly, a weeping threshold, a swelling threshold, an instability threshold, a maximum or minimum ambient relative humidity input to the solar thermal unit, a maximum or minimum relative humidity output from the solar thermal unit, a system power state or availability (e.g., from the PV panel), a system battery state of charge or battery power availability, a flow rate of the process gas, a loading cycle duration, a loading cycle start time, a loading cycle end time and combinations thereof. In some embodiments, operation 1006 comprises determining the power state or availability of the system based on the received solar irradiation during the prior and/or current unloading cycle.

In various embodiments, operation 1006 can include an operation of determining an initial loading water content, equilibrated water content, water vapor pressure or equivalent relative humidity of the hygroscopic composite and/or composite assembly based on the received operational parameter from the prior and/or current unloading cycle and the received hygroscopic material, composite and/or assembly property. For example, the controller can determine an equilibrated water content or relative humidity of the hygroscopic composite assembly from the prior and/or current unloading cycle. The equilibrated water content can reflect the final water content at the end of the unloading cycle and/or the residual water or 'well' of water remaining in the hygroscopic composite assembly. The equilibrated water content can also be considered an initial water content or equilibrated water content at the beginning of the subsequent loading cycle(s).

In various embodiments, it can be preferable to maintain a relatively high residual water content in the composite assembly (i.e., maintain a residual water content in the composite assembly that is not extracted to produce water) during load/unloading cycling. This may avoid or minimize reaching a 'low-grade' water condition or a low water vapor pressure state of the hygroscopic composite wherein more energy is required to extract residual or remaining water in the hygroscopic composite. As an illustrative example, a low water vapor pressure state of the hygroscopic composite can be related to the ratio of absorbed water to the hygroscopic material, hygroscopic salt content, or open water sorption sites. At a lower ratio of absorbed water to hygroscopic salt, the hygroscopic composite holds or binds water tighter and therefore, can require more energy to desorb. In other words, at a lower ratio of absorbed water to hygroscopic salt, the hygroscopic composite has a higher differential water vapor pressure. A higher salt content can support a greater amount of water which can be extracted at a lower energy and/or can have a lower differential water vapor pressure, however a hygroscopic composite with a higher salt content can reach a weeping, swelling or unstable condition at lower total water loads, e.g., total volume or mass of water in the composite assembly. Therefore, control approaches of the present technology can include an operation of determining a weeping, swelling or instability threshold for a hygroscopic composite or assembly so as to maintain a high level of water production while avoiding weeping, swelling or other instability.

At operation 1010, a process gas flows through the hygroscopic composite assembly in a process flow path during a loading cycle at the determined loading operational setpoint. At operation 1010, hygroscopic composite assembly absorbs or captures water vapor from the process gas upon flowing therethrough.

At operation 1020, the method includes transitioning from the loading cycle to an unloading cycle. In one example, the method comprises monitoring ambient conditions (e.g. solar irradiance, relative humidity, temperature) and/or actual or estimated amount of water in the water generation system (e.g. loading equivalent relative humidity, equilibrated water content or present water content) of the hygroscopic composite assembly in the solar thermal unit) and, based on the monitored or estimated data, transitioning from the load mode to the release mode.

As depicted in flowchart 1000, the method comprises flowing a working gas through the hygroscopic composite assembly in a regeneration flow path during the unloading cycle at operation 1022. At operation 1022, the working fluid can accumulate both heat and water vapor from the hygroscopic composite assembly upon flowing therethrough. Operation 1022 can also include directing the working gas to an upper portion or layer of the solar thermal unit in advance of the hygroscopic composite assembly in the solar thermal unit.

In some embodiments, the method can comprise transferring, via an exchange unit, heat from the working gas output from the solar thermal unit (i.e., in advance of the condenser) to the working gas output from the condenser in advance of input to the solar thermal unit at operation 1022. Furthermore, at operation 1022, the method can comprise transferring, via an exchange unit (e.g. rotary desiccant), water vapor from the working gas output from the condenser in advance of the solar thermal unit to the working gas output from the solar thermal unit in advance of the condenser.

At operation 1022, the rate of energy exchange between regeneration flow path segments (e.g. flow segment rom solar thermal unit to condenser and flow segment from condenser to solar thermal unit) can be varied based on one or more of: a user selection, data received from one or more sensors (e.g. data relating to one or more ambient conditions, data relating to working fluid water content, water content in solar thermal unit, working fluid temperature, etc.), forecast conditions, programmatic control, an algorithm, and/or by any other desirable bases. In on example, the method comprises continuous monitoring of ambient conditions (e.g. solar irradiance, relative humidity, temperature) and/or actual or estimated amount of water in the working fluid or thermal desiccant unit and, based on the monitored or estimated data.

At operation 1030, the method can include an operation of condensing water vapor from the working fluid in the regeneration flow path to produce water during the unloading cycle. According to an embodiment, operations 1022 and 1030 can occur simultaneously during an unloading cycle.

At operation 1040, the method can be repeated or cycled. Transitioning between the loading cycle and the unloading cycle can be based on one or more of: a user selection, data received from one or more sensors (e.g. data relating to one or more ambient conditions, data relating to working fluid water content, water content in solar thermal unit, etc.), forecast conditions, programmatic control, an algorithm, and/or by any other desirable bases. In on example, the method comprises continuous monitoring of ambient conditions (e.g. solar irradiance, relative humidity, temperature) and/or actual or estimated amount of water in the working fluid or thermal desiccant unit and, based on the monitored or estimated data, transitioning from the load time to the release time. In various implementations, the method can include determining if a water mass uptake by the desiccant in the thermal unit is greater than a predetermined mass associated with a nighttime relative humidity (e.g. average relative humidity at the panel) during a during nighttime or load time.

The control system can dynamically and efficiently produce water based on ambient environmental conditions (e.g. solar insolation, solar irradiance, temperature, RH) in combination with system operational properties or status (e.g. water content in solar thermal unit, battery state of charge (SOC) or battery power availability, and so on). For example, the operational ranges and/or setpoints of system 100 can be determined and dynamically adjusted (e.g. according to the diurnal cycle) so as to efficiently drive water vapor from the hygroscopic material (e.g., in the solar thermal unit 110) towards vapor pressure saturation in the working fluid and condensation at the condenser.

Figure 14A:
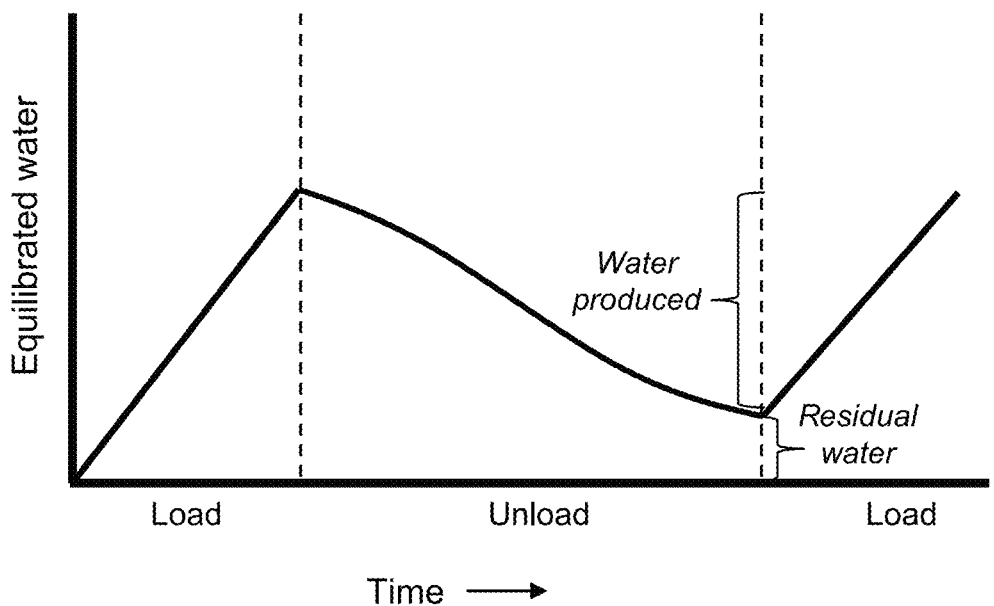
FIG. 14A shows a plot of equilibrated water in a hygroscopic composite or composite assembly for loading and unloading operational cycles during operation of a water generation system, according to an embodiment.

As an illustrative example, FIG. 14A shows a plot of equilibrated water in a hygroscopic composite assembly for an initial or commissioning loading cycle, an unloading cycle and a subsequent loading cycle during operation of a water generation system for a hygroscopic composite assembly comprising a low hygroscopic salt content (e.g., less than 22 wt %). For comparison, FIG. 14B shows a plot of equilibrated water content in a hygroscopic composite assembly for an initial or commissioning loading cycle, an unloading cycle and a subsequent loading cycle during operation of a water generation system for a hygroscopic composite assembly comprising a higher hygroscopic salt content (e.g., greater than 25 wt %).

Figure 14B:
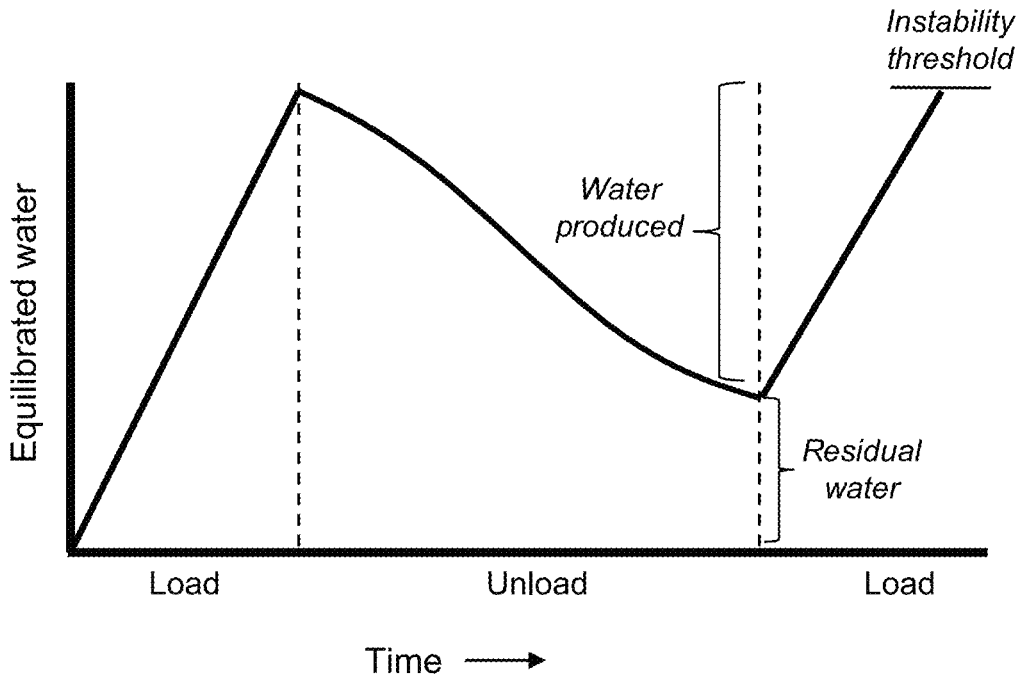
FIG. 14B shows a plot of equilibrated water in a hygroscopic composite or composite assembly for loading and unloading operational cycles during operation of a water generation system, according to an embodiment.

During the first load cycle of FIG. 14B, the hygroscopic composite assembly equilibrates a greater amount of water than the hygroscopic composite assembly of FIG. 14A during the first load cycle (assuming conditions of the process gas during loading are equivalent). As such, the initial equilibrated state of the water on the hygroscopic composite of FIG. 14B at the beginning of the subsequent unloading cycle is higher than that of the hygroscopic composite of FIG. 14A.

During the first unloading cycle of FIG. 14A, the hygroscopic composite assembly releases less water vapor, and in turn the system produces less water, than the hygroscopic composite assembly of FIG. 14B during the load cycle. The production of water over the course of an unloading cycle may be a function of both the amount of water present in the hygroscopic composite, and also the equilibrated state of the water that is in the hygroscopic composite. It is important to make this distinction because the equilibrated state of the water in the hygroscopic composite may relate to the amount of energy needed to extract the water from the hygroscopic composite. In many embodiments, it may be preferable to operate the water generation system in a regime where the equilibrated state of the water in the hygroscopic composite is more favorable to extraction of water at a lower energy cost, and thus to more efficient water production.

In FIG. 14A, the starting equilibrated water content in hygroscopic composite assembly at the beginning of the subsequent loading cycle is lower than the starting equilibrated water content of the hygroscopic composite assembly of FIG. 14B. Furthermore, there is a significantly more water remaining or residual water in hygroscopic composite of FIG. 14B. Furthermore, the hygroscopic composite of FIG. 14B equilibrate water to reach a higher relative humidity or than the hygroscopic composite of FIG. 14A. In various embodiments, it can be preferable to maintain a relatively high residual water content in the composite assembly (i.e., maintain a residual water content in the composite assembly that is not extracted to produce water) during load/unloading cycling. This can reduce or minimize operation at low water vapor pressure states wherein more energy is required to extract residual or remaining water in the hygroscopic composite. However, in such embodiments, operation or cycling at higher equilibrated water content may result in weeping, swelling or other instability relating to water uptake.

In an embodiment, the methods of operating water generation systems of the present technology can allow for continuous cycling at high water vapor pressure states while avoiding weeping, swelling or other degradation or failure for the highly efficient production of water. As shown in the example of FIG. 14B, a weeping, swelling or instability control limit or predetermined weeping, swelling or instability threshold can be determined for the loading cycle operation such that once the equilibrated water or present water content in the hygroscopic composite reaches the weeping, swelling or instability threshold, the system can cease loading of more water in the hygroscopic composite. In an embodiment, the predetermined weeping, swelling or instability threshold can be based on a hygroscopic composite property, for example, hygroscopic material content, porosity or a combination thereof.

Figure 15:
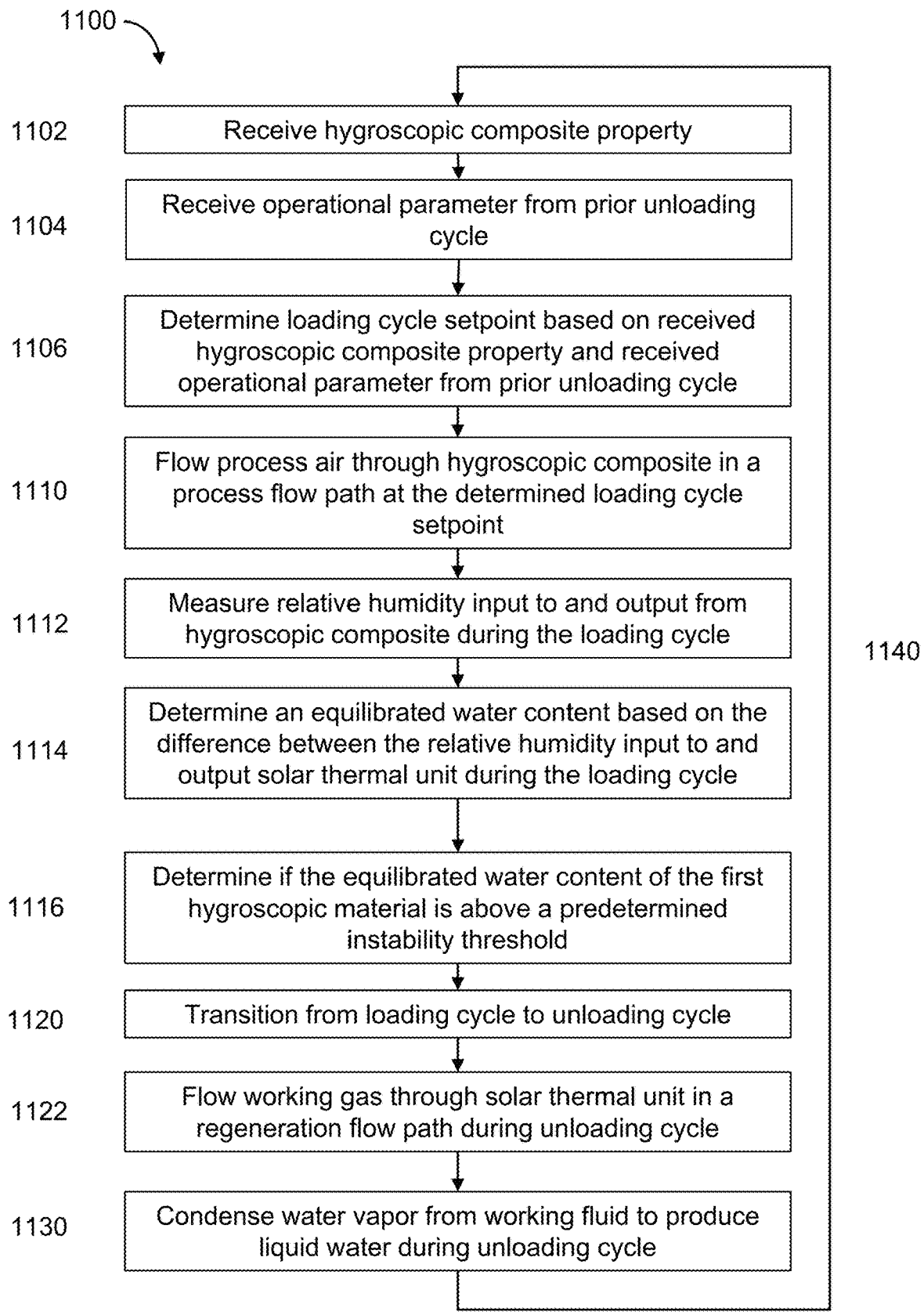
FIG. 15 illustrates a method of operating a water generation system, according to an embodiment.

As another example, FIG. 15 illustrates a method of operating a water generation system. Unless otherwise specified below, the numerical indicators used to refer to operations of FIG. 15 are similar to those used to refer to operations in FIG. 13 above, except that the index has been incremented by 100.

As depicted in FIG. 15, a water generation system controller can receive a hygroscopic composite property of a hygroscopic composite and/or assembly in a solar thermal unit at operation 1102. At operation 1104, a system controller can receive or determine an operational parameter from a prior unloading cycle of the solar thermal unit. For example, the controller can receive or determine an amount or total volume of water produced by the condenser in a prior unloading cycle, an environmental condition during the prior unloading cycle, an amount of solar energy or solar irradiation in the prior unloading cycle, a system power state, a system battery state of charge, or combinations thereof. In some embodiments, the method can comprise determining an equilibrated water content or relative humidity of the hygroscopic composite assembly at the end of the prior unloading cycle at operation 1104.

At operation 1106, a system controller can determine a loading operational setpoint based on the received hygroscopic composite property from operation 1102 and the received or determined operational parameter from prior unloading cycle at operation 1104. For example, the controller can determine a loading cycle setpoint relating to a weeping, swelling or instability threshold (e.g. maximum equilibrated water in hygroscopic composite assembly) and/or the power state of the system (e.g. battery SOC, received solar irradiance during prior day, and/or the like). In an embodiment, operation 1106 can comprise determining the loading operational setpoint based on a received system power state. In some embodiments, the method comprises measuring an ambient solar irradiance, cloudy condition or weather event and determining a loading operational setpoint in response to the measured ambient solar irradiance, cloudy condition or weather event. In some embodiments, operation 1106 can comprise forecasting an ambient solar irradiance, cloudy condition or a weather event; and, determining the loading operational setpoint in response to the forecast ambient solar irradiance, cloudy condition or weather event. In various embodiments, the method can comprise receiving an environmental condition and/or a system operational state; and determining a power discharge setpoint during the loading cycle based on the received environmental condition and/or system power state.

At operation 1110, a process gas can flow through the hygroscopic composite assembly in a process flow path during a loading cycle at the determined loading operational setpoint. At operation 1110, the hygroscopic composite assembly absorbs or captures water vapor from the process gas upon flowing therethrough.

At operation 1112, the method can comprise the operation comprises the operation of measuring or determining an ambient condition external to the solar thermal unit. In one example, operation 1112 comprises measuring a specific or relative humidity input to the solar thermal unit (e.g. ambient air RH) and/or a specific or relative humidity output from the solar thermal unit during current and/or prior loading cycle(s). In another example, operation 1112 comprises measuring a relative humidity input to the solar thermal unit (e.g. ambient air RH) and/or a relative humidity output from the solar thermal unit during current and/or prior unloading cycle(s).

At operation 1114, the method can comprise the operation of determining the equilibrated water content of the hygroscopic composite assembly as the loading cycle proceeds. In one embodiment, operation 1114 includes determining the equilibrated water content of the hygroscopic composite assembly based on the measured ambient environmental condition. In one example, operation 1114 includes determining the difference between the specific or relative humidity input to the solar thermal unit and the specific or relative humidity output from the solar thermal unit during the current and/or prior unloading cycle(s). In another example, the operation 1114 includes determining a difference between the specific or relative humidity input to the solar thermal unit and the specific or relative humidity output from the solar thermal unit during the current and/or prior loading cycle(s).

At operation 1116, the method can comprise the operation of determining if the equivalent relative humidity, equilibrated water content or present water content of the hygroscopic composite assembly is above a predetermined weeping, swelling or instability threshold. If the equivalent relative humidity, equilibrated water content or present water content of the hygroscopic composite assembly is above the predetermined weeping, swelling or instability threshold, the system can cease flow of the process gas through the hygroscopic composite assembly at operation 1116. In some embodiments, the method can comprise determining a final equilibrated water content of the hygroscopic composite assembly at the end of the loading cycle. Additionally, some embodiments can include determining an unloading operational setpoint to set an initial water content or residual water content for a subsequent loading cycle. In one example, the method comprises determining an unloading operational setpoint based on a measured or forecast solar irradiance. As another example, the method can comprise determining if an accumulation of the difference between the specific humidity input to the solar thermal unit and the specific humidity output from the solar thermal unit is above a predetermined threshold. If the difference between the specific humidity input to the solar thermal unit and the specific humidity output from the solar thermal unit is above the predetermined threshold, the system can cease flow of the process gas through the hygroscopic composite assembly at operation 1116.

In one embodiment, operation 1116 can comprise an operation of measuring an electrical conductivity of the hygroscopic composite assembly. The equilibrated water content of the hygroscopic composite assembly can be determined from the measured electrical conductivity, for example a conductivity increase can be calibrated to an increase in equilibrated water content. As another example, operation 1116 can include measuring a weight of the hygroscopic composite assembly and, determining the equilibrated water content of the hygroscopic composite assembly based on the measured weight, for example a weight increase can be calibrated to an increase in equilibrated water content. As yet another example, operation 1116 can include measuring formation of a liquid droplet below the hygroscopic composite assembly; and, determining the equilibrated water content and/or a weeping, swelling or unstable condition of the hygroscopic composite assembly based on the measured water droplet.

At operation 1120, the method can comprise transitioning from the loading cycle to an unloading cycle. In one example, the method comprises monitoring ambient conditions (e.g. solar irradiance, relative humidity, temperature) and/or actual or estimated amount of water in the water generation system (e.g. loading equivalent relative humidity of the hygroscopic composite assembly in the solar thermal unit) and, based on the monitored or estimated data, transitioning from the load mode to the release mode. In various embodiments, the method can comprise receiving an environmental condition and/or a system operational state; and determining a power discharge setpoint during the unloading cycle based on the received environmental condition and/or system power state.

As depicted in flowchart 1100, the method can comprise flowing a working gas through the hygroscopic composite assembly in a regeneration flow path during the unloading cycle at operation 1122. At operation 1122, the working fluid can accumulate both heat and water vapor from the hygroscopic composite assembly upon flowing therethrough. Operation 1122 can also include directing the working gas to an upper portion or layer of the solar thermal unit in advance of the hygroscopic composite assembly in the solar thermal unit.

At operation 1130, the method can include an operation of condensing water vapor from the working fluid in the regeneration flow path to produce water during the unloading cycle. According to an embodiment, operations 1122 and 1130 can occur simultaneously during an unloading cycle.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions and addressing the same or different problems. Similarly, it will be understood that the benefits and advantages described above may relate to one embodiment or may relate to several embodiments.

Furthermore, the materials selection and controls approach can be employed for any material systems used in water generators that having a lower and/or upper operational bound or limit relating to a weeping potential, swelling potential, low vapor pressure condition, swelling, a pressure drop on water uptake, mechanical instability, chemical instability, cycling stability, or combinations thereof. Accordingly, the material design and control approaches described herein can be modified such that additional embodiments may be realized with operational, logical, chemical, and/or mechanical changes without departing from the spirit and scope of the disclosure.

The claims are not intended to include, and should not be interpreted to include, means-plus- or step-plus-function limitations, unless such a limitation is explicitly recited in a given claim using the phrase(s) "means for" or "step for," respectively. The term "about" or "substantially," as used herein, is intended to encompass minor deviations rather define an exact value.

The invention claimed is:

1. A system for generating water comprising:
a solar thermal unit comprising a first composite assembly including a first hygroscopic composite to capture water vapor from a process gas flowing in a process flow path through the first composite assembly during a loading cycle;
the first composite assembly being configured to absorb thermal energy and release water vapor to a working fluid flowing in a regeneration flow path through the first composite assembly during an unloading cycle; and
a condenser for condensing water vapor to produce water from the working fluid flowing in the regeneration flow path after flowing through the first composite assembly;
a controller configured to:
receive an operational parameter of the water generation system;
determine a water content of the first hygroscopic composite based on the operational parameter; and
determine, based on the operational parameter, a loading operational setpoint, an unloading operational setpoint, or a combination thereof.

2. The system of claim 1, wherein the solar thermal unit further comprises a photovoltaic (PV) panel,
wherein the first composite assembly is configured to absorb thermal energy from a rear surface of the PV panel; and
wherein the operational parameter comprises a system power state based on the electrical energy generated by the PV panel.

3. The system of claim 1, further comprising:
a first exchange unit operatively coupled between the solar thermal unit and the condenser;
wherein the first exchange unit transfers enthalpy between the working fluid output from the solar thermal unit and the working fluid output from the condenser during an unloading cycle; and
wherein the first exchange unit transfers enthalpy between the working fluid input to the solar thermal unit and the working fluid input to the condenser.

4. A method for producing water from air comprising:
receiving, by a controller of a water generation system, an operational parameter from a first unloading cycle of a solar thermal unit of the water generation system comprising a first hygroscopic assembly including a first hygroscopic composite;
determining, by the controller, an equilibrated water content of the first hygroscopic composite assembly based on the received operational parameter from the first unloading cycle;
determining, by the controller, a loading operational setpoint based on the determined equilibrated water content of the first hygroscopic composite assembly;
flowing a process gas through the first hygroscopic composite assembly in a process flow path during a first loading cycle at the determined loading operational setpoint; wherein the first hygroscopic composite assembly captures water vapor from the process gas upon flowing therethrough;
transitioning from the first loading cycle to a second unloading cycle;
flowing a working gas through the first hygroscopic composite assembly in a regeneration flow path during the second unloading cycle; wherein the working gas accumulates heat and water vapor from the first hygroscopic composite assembly upon flowing therethrough; and condensing, by a condenser, water vapor from the working gas in the regeneration flow path to produce water during the second unloading cycle.

5. The method of claim 4, wherein receiving the operational parameter from the first unloading cycle comprises at least one of:
receiving a hygroscopic composite property of the first hygroscopic composite assembly in the solar thermal unit;
receiving an amount of water produced by a condenser of the water generation system;
receiving an environmental condition during the first unloading cycle;
receiving a solar irradiation during the first unloading cycle; and
receiving a system power state.

6. The method of claim 4, wherein the method further comprises at least one of:
determining a power availability of the system based on solar irradiation during received during the first unloading cycle;
determining a water content of the hygroscopic composite; and
determining if a water content of the first hygroscopic composite assembly during the first loading cycle is above a predetermined weeping, swelling or instability threshold; the predetermined weeping, swelling or instability threshold being based on a first hygroscopic composite property.

7. The method of claim 4, wherein the method further comprises at least one of:
measuring an ambient condition external to the solar thermal unit;
measuring a relative humidity input to the solar thermal unit;
measuring a relative humidity output from the solar thermal unit;
determining a present water content of the first hygroscopic material based on the difference between a relative humidity input to the solar thermal unit and a relative humidity output from the solar thermal unit;
determining if a present water content of the first hygroscopic material is above a predetermined instability threshold; and
ceasing flow of the process gas through the first hygroscopic composite assembly if a present water content of the first hygroscopic material is above a predetermined instability threshold.

8. The method of claim 4, wherein the method further comprises at least one of:
determining a final water content of the first hygroscopic composite at the end of the first loading cycle; and
determining an unloading operational setpoint of the second unloading cycle to set an initial water content of a second loading cycle.

9. A method for producing water from air comprising:
receiving, by a controller of a water generation system, an operational parameter, the operational parameter comprising: a water production amount, solar radiation received by the water generation system, a power state of the water generation system, a relative humidity input to the water generation system, a relative humidity output from the water generation system, or a combination thereof;
determining a loading operational setpoint based on the operational parameter;
flowing a process gas through the solar thermal unit in a process flow path through a first hygroscopic composite during a loading cycle at the loading operational setpoint; wherein the first hygroscopic composite captures water vapor from the process gas upon flowing therethrough;
determining an equilibrated water content of the first hygroscopic composite based on the operational parameter;
transitioning from the loading cycle to an unloading cycle if the equilibrated water content of the first hygroscopic composite is above a predetermined threshold;
flowing a working gas through the first hygroscopic composite during the unloading cycle; wherein the working gas accumulates heat and water vapor from the first hygroscopic composite upon flowing therethrough; and
condensing water vapor from the working gas to produce water during the unloading cycle.

10. The method of claim 9, further comprising:
measuring an ambient environmental condition external to the system;
wherein determining the equilibrated water content of the hygroscopic composite comprises determining the equilibrated water content of the hygroscopic composite based on the measured ambient environmental condition.

11. The method of claim 9, wherein determining the equilibrated water content of the first hygroscopic composite comprises:
monitoring an ambient humidity input to the solar thermal unit and monitoring a relative the solar thermal unit during the loading cycle; and
determining the equilibrated water content of the first hygroscopic composite based on the difference between the specific humidity input to the solar thermal unit and the specific humidity output from the solar thermal unit during the loading cycle.

12. The method of claim 11, wherein the method further comprises:
determining if an accumulation of the difference between the specific humidity input to the solar thermal unit and the specific humidity output from the solar thermal unit is above a predetermined threshold; and
ceasing flow of the process gas through the first hygroscopic composite if the difference between the specific humidity input to the solar thermal unit and the specific humidity output from the solar thermal unit is above the predetermined threshold.

13. The method of claim 9, wherein the method further comprises:
measuring an ambient solar irradiance, cloudy condition or weather event; and
determining the loading operational setpoint in response to the measured ambient solar irradiance, cloudy condition or weather event.

14. The method of claim 9, wherein the method further comprises:
forecasting an ambient solar irradiance, cloudy condition or a weather event; and
determining the loading operational setpoint in response to the forecast ambient solar irradiance, cloudy condition or weather event.

15. The method of claim 9, wherein the method further comprises determining a power discharge setpoint based on an environmental condition and the system power state.

16. The method of claim 9, wherein the method further comprises determining an unloading operational setpoint based on a measured or forecast solar irradiance.

17. The method of claim 9, wherein flowing the working gas through the first hygroscopic composite comprises directing the working gas to an uppermost layer of the solar thermal unit in advance of the first hygroscopic composite in the solar thermal unit.

18. The method of claim 9, further comprising transferring energy between regeneration flow paths during unloading cycle.

19. The method of claim 9, further comprising at least one of:
- measuring an electrical conductivity of the first hygroscopic composite;
- determining the equilibrated water content of the first hygroscopic composite based on a measured electrical conductivity;
- measuring a weight of the first hygroscopic composite; and
- determining the equilibrated water content of the first hygroscopic composite based on a measured weight of the first hygroscopic composite.

20. The method of claim 9, further comprising measuring formation of a liquid water droplet below the first hygroscopic composite; and, determining the equilibrated water content of the first hygroscopic composite based on the measured liquid water droplet.

\* \* \* \* \*